United States Patent
Kang

(10) Patent No.: US 11,995,323 B2
(45) Date of Patent: May 28, 2024

(54) MEMORY CONTROLLER AND OPERATING METHOD THEREOF

(71) Applicant: SK hynix Inc., Gyeonggi-do (KR)

(72) Inventor: Hye Mi Kang, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 15 days.

(21) Appl. No.: 17/984,484

(22) Filed: Nov. 10, 2022

(65) Prior Publication Data

US 2023/0297248 A1 Sep. 21, 2023

(30) Foreign Application Priority Data

Mar. 16, 2022 (KR) .......................... 10-2022-0032679

(51) Int. Cl.
*G06F 3/06* (2006.01)

(52) U.S. Cl.
CPC .......... *G06F 3/0619* (2013.01); *G06F 3/0653* (2013.01); *G06F 3/0679* (2013.01)

(58) Field of Classification Search
CPC .... G06F 3/0619; G06F 3/0653; G06F 3/0679; G06F 3/0658; G06F 3/0659; G06F 11/1441; G06F 11/1458
See application file for complete search history.

(56) References Cited

U.S. PATENT DOCUMENTS

| 10,359,955 | B2 | 7/2019 | Inbar et al. | |
| 2018/0239547 | A1* | 8/2018 | Inbar | G06F 12/0246 |
| 2020/0201570 | A1* | 6/2020 | Kim | G06F 3/0659 |
| 2023/0195369 | A1* | 6/2023 | Cariello | G06F 11/073 |
| | | | | 711/154 |

FOREIGN PATENT DOCUMENTS

| KR | 10-2019-0086341 A | 7/2019 |
| KR | 10-2019-0096838 A | 8/2019 |
| KR | 10-2019-0124591 A | 11/2019 |

* cited by examiner

*Primary Examiner* — Khoa D Doan
(74) *Attorney, Agent, or Firm* — IP & T GROUP LLP

(57) ABSTRACT

A memory controller includes a data detection circuit configured to detect, when power is supplied after a sudden power-off (SPO), a lost write sequence index "M" among the plural write sequence indexes, and detect first data corresponding to a write sequence index "M−1" and second data corresponding to a write sequence index "M+1"; a barrier decision circuit configured to determine, based on whether first barrier information of the first data and second barrier information of the second data are identical with each other, whether a barrier request for the first data has been received from a host; and a data recovery operation determination circuit configured to determine whether to perform a recovery operation on target data corresponding to the write sequence index "M+1" and thereafter based on whether the barrier request for the first data has been received.

33 Claims, 13 Drawing Sheets

FIG. 6A

| | WT_ORDER | B_INF | |
|---|---|---|---|
| GROUP 1 { | #1 | 0 | |
| | #2 | 0 | |
| | #3 | 0 | |
| | #4 | 0 | |
| GROUP 2 { | #5 | 1 | → ① NOT THE SAME |
| GROUP 3 { | #6 | 2 | |
| | #7 | 2 | → ② THE SAME |

| | WT_ORDER | B_INF | |
|---|---|---|---|
| GROUP 1 { | #1 | 0 | |
| | #2 | 0 | |
| | #3 | 0 | |
| | #4 | 0 | |
| GROUP 2 { | #5 | #4 | → ① NOT THE SAME |
| GROUP 3 { | #6 | #5 | |
| | #7 | #5 | → ② THE SAME |

144A

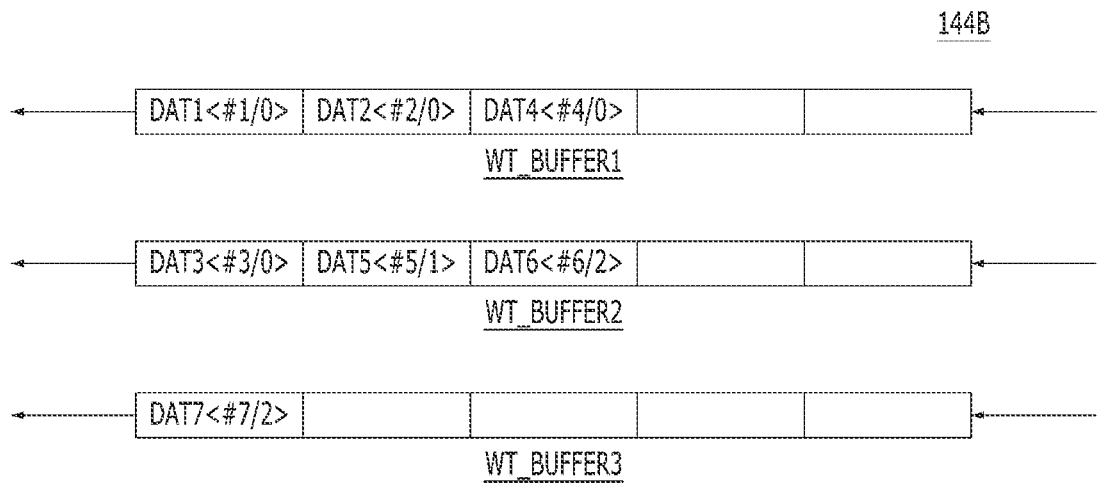

MEMORY CONTROLLER AND OPERATING METHOD THEREOF

CROSS-REFERENCE TO RELATED APPLICATION

This application claims priority under 35 U.S.C. § 119 to Korean Patent Application No. 10-2022-0032679 filed on Mar. 16, 2022, which is incorporated herein by reference in its entirety.

BACKGROUND

1. Field

Various embodiments of the present disclosure relate to an electronic device, and more particularly, to a memory controller and an operating method thereof.

2. Discussion of the Related Art

The computer environment paradigm has been transitioning to ubiquitous computing, which enables computing systems to be used anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Since memory systems have no moving parts, memory systems provide advantages such as excellent stability and durability, high information access speed, and low power consumption, Examples of memory systems having such advantages include universal serial bus (USB) memory devices, memory cards having various interfaces, and solid state drives (SSD).

SUMMARY

Various embodiments of the present disclosure are directed to a memory controller which does not perform an unnecessary data recovery operation based on a progress state of a write operation and barrier information, and an operating method thereof.

Also, various embodiments of the present disclosure are directed to a memory controller which determines whether to perform a data recovery operation based on barrier information that is not influenced by a sudden power-off (SPO) and that has been stored in a nonvolatile memory device, and an operating method thereof.

Also, various embodiments of the present disclosure are directed to a memory controller capable of performing a write operation without taking into consideration a write order of data based on a barrier request that is received from an external device, and an operating method thereof.

In accordance with an embodiment of the present disclosure, a memory controller for controlling a memory device storing plural pieces of data and plural write sequence indexes and plural pieces of barrier information corresponding to the plural pieces of data, the memory controller comprising: a data detection circuit configured to detect, when power is supplied after a sudden power-off (SPO), a lost write sequence index "M" among the plural write sequence indexes, and detect first data corresponding to a write sequence index "M−1" and second data corresponding to a write sequence index "M+1"; a barrier decision circuit configured to determine, based on whether first barrier information of the first data and second barrier information of the second data are identical with each other, whether a barrier request for the first data has been received from a host; and a data recovery operation determination circuit configured to determine whether to perform a recovery operation on target data corresponding to the write sequence index "M+1" and thereafter based on whether the barrier request for the first data has been received.

Each of the first barrier information and the second barrier information may comprise an accumulated number of barrier requests that have been received before a write request for a corresponding one of the first data and the second data from the host is requested.

Each of the first barrier information and the second barrier information may comprise a write sequence index of data for which a write request has been requested right before a most recent barrier request among barrier requests received before a write request for a corresponding one of the first data and the second data from the host is requested.

In accordance with an embodiment of the present disclosure, an operating method comprising: reading, from a memory device when power is supplied after a sudden power-off (SPO), plural pieces of data and plural write sequence indexes and plural pieces of barrier information corresponding to the plural pieces of data; detecting a write sequence index "M" corresponding to lost data among the plural pieces of data; detecting first data corresponding to a write sequence index "M−1" and second data corresponding to a write sequence index "M+1"; determining, based on first barrier information of the first data and second barrier information of the second data, whether a barrier request for the first data has been received from a host; and determining whether to perform a recovery operation on target data corresponding to a write sequence index "M+1" and thereafter based on whether the barrier request for the first data has been received.

Each of the first barrier information and the second barrier information may comprise an accumulated number of barrier requests that have been received before a write request for a corresponding one of the first data and the second data from the host is requested.

Each of the first barrier information and the second barrier information may comprise a write sequence index of data for which a write request has been requested right before a most recent barrier request among barrier requests received before a write request for a corresponding one of the first data and the second data is made.

In accordance with an embodiment of the present disclosure, a memory controller for controlling a memory device storing plural pieces of data and plural write sequence indexes and plural pieces of barrier information corresponding to the plural pieces of data, the memory controller comprising: a data detection circuit configured to detect, when power is supplied after a sudden power-off (SPO) a lost write sequence index "M" among the plural write sequence indexes, and detect first data corresponding to a write sequence index "M−1" and second data corresponding to a write sequence index "M+1", a barrier decision circuit configured to determine, based on whether first barrier information of the first data and second barrier information of the second data are identical with each other, whether a barrier request for the first data has been received from a host; and a data recovery operation determination circuit configured to determine whether to perform a recovery operation on target data corresponding to a write sequence index "M+1" and thereafter based on whether logical device identifiers of the first data and the second data are identical with each other if the barrier request for the first data has been received.

Each of the first barrier information and the second barrier information may comprise an accumulated number of barrier requests that have been received before a write request for a corresponding one of the first data and the second data from the host is requested.

Each of the first barrier information and the second barrier information may comprise a write sequence index of data for which a write request has been requested right before a most recent barrier request among barrier requests received before a write request for a corresponding one of the first data and the second data from the host is requested.

In accordance with an embodiment of the present disclosure, an operating method of a memory controller, comprising: reading, from a memory device, a plurality of data, and a plurality of write request orders and a plurality of pieces of barrier information corresponding to the plurality of data when power is supplied after sudden power-off (SPO); detecting a write request order "M" of omitted data among the plurality of data; detecting first data having a write request order of "M−1" and second data having a write request order of "M+1"; determining whether a barrier request for the first data which has been received from a host, has been received based on first barrier information of the first data and second barrier information of the second data; and determining whether to perform a recovery operation on recovery target data having a write request order of "M+1" or more based on whether logical device identifiers of the first data and the second data are identical with each other if the barrier request has been received.

Each of the first barrier information and the second barrier information may include an accumulated number of barrier requests that have been received before a write request for each of the first data and the second data from the host is requested.

Each of the first barrier information and the second barrier information may include a write request order of data for which a write request has been requested right before a barrier request that has been most recently received, among barrier requests received before a write request for each of the first data and the second data is requested.

In accordance with an embodiment of the present disclosure, an operating method of a controller, the operating method comprising: flushing, into a memory device when a power supply is interrupted, a sequence of data pieces and respectively corresponding sets each of an index within the sequence and an information piece; and recovering, when the power supply is recovered and an M-th data piece is determined as lost in the sequence during the flushing, an (M+1)-th data piece and thereafter in the sequence if the information pieces respectively corresponding to (M−1)-th and (M+1)-th data pieces have the same value, wherein the information piece corresponding to the data piece represents at least one of: an accumulated number of barrier requests provided thereto before a write request for the data piece, and the index corresponding to a data piece, for which a write request is provided right before a most recent one of the barrier requests.

In accordance with an embodiment of the present disclosure, an operating method of a controller, the operating method comprising: flushing a sequence of data pieces therefrom into a memory device when a power supply is interrupted; and recovering, when the power supply is recovered and an M-th data piece is determined as lost in the sequence during the flushing of the sequence, an (M+1)-th data piece and thereafter in the sequence if a barrier request is provided thereto for an (M−1)-th data piece.

The operating method may further comprise flushing, therefrom into the memory device, sets each of an index within the sequence and an information piece during the flushing of the sequence, the sets respectively corresponding to the flushed data pieces of the sequence, and wherein the recovering includes determining the barrier request for the (M−1)-th data piece as provided thereto when the information pieces respectively corresponding to the (M−1)-th and (M+1)-th data pieces have the same value.

The information piece corresponding to the data piece represents at least one of: an accumulated number of barrier requests provided thereto before a write request for the data piece, and the index corresponding to a data piece, for which a write request is provided right before a most recent one of the barrier requests.

In accordance with the present embodiment, it is possible to reduce overhead which may occur during an operation of a memory system because an unnecessary data recovery operation may be reduced based on a progress state of a write operation and barrier information.

In accordance with an embodiment of the present disclosure, it is possible to improve the reliability of a data recovery operation because whether to perform the data recovery operation may be determined based on barrier information that is not influenced by SPO and that has been stored in a nonvolatile memory device.

In accordance with an embodiment of the present disclosure, it is possible to reduce a write operation time by the time taken to guarantee a write order because a write operation is performed without taking into consideration a write order of data based on a barrier request received from a host.

BRIEF DESCRIPTION OF THE DRAWINGS

Hereinafter, various embodiments of the present disclosure will be described in detail with reference to the accompanying drawings.

However, the present disclosure is not limited to the embodiments disclosed below, and may be implemented in various other forms. The disclosed embodiments are provided to make the present disclosure complete and to enable those skilled in the art to fully understand the scope of the present disclosure.

FIGS. 6A and 6B illustrate detailed examples of a write sequence index and barrier information according to an embodiment of the present disclosure, FIG. 7 illustrates a detailed example of plural pieces of data that are stored in a plurality of write buffers according to an embodiment of the present disclosure.

FIG. 8 illustrates a detailed example of plural pieces of data that have been flushed into a memory device according to an embodiment of the present disclosure.

DETAILED DESCRIPTION

Figure 1:
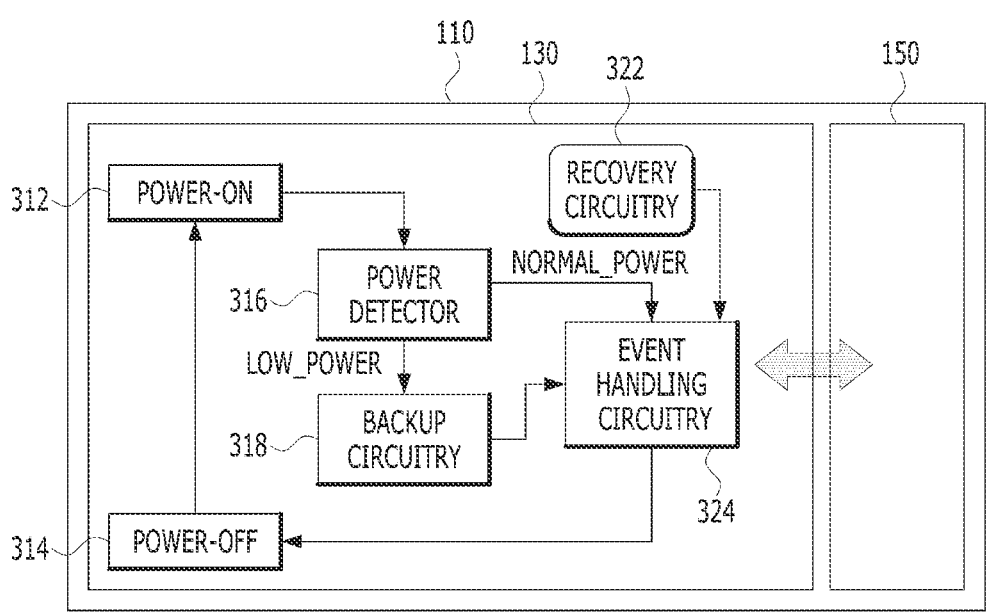
FIG. 1 is a diagram for describing an operation of a data processing system according to an embodiment of the present disclosure.

Various embodiments of the present disclosure are described below in more detail with reference to the accompanying drawings. These embodiments are provided so that this disclosure is thorough and complete, and fully conveys the scope of the present disclosure to those skilled in the art. Throughout the disclosure, like reference numerals refer to like parts throughout the various figures and embodiments of the present disclosure.

It is noted that reference to "an embodiment," "another embodiment" or the like does not necessarily mean only one embodiment, and different references to any such phrase are not necessarily to the same embodiment(s).

It will be understood that, although the terms "first", "second", "third", and so on may be used herein to describe various dements, these dements are not limited by these terms. These terms are used to distinguish one element from another element. Thus, a first element described below could also be termed as a second or third element without departing from the spirit and scope of the present disclosure.

It will be further understood that the terms "comprises," "comprising," "includes," and "including" when used in this specification, specify the presence of the stated dements and do not preclude the presence or addition of one or more other elements. As used herein, the term "and/or" includes any and all combinations of one or more of the associated listed items.

As used herein, singular forms may include the plural forms as well and vice versa, unless the context clearly indicates otherwise. The articles 'a' and 'an' as used in this application and the appended claims should generally be construed to mean 'one or more' unless specified otherwise or clear from context to be directed to a singular form.

In FIG. 1, a memory system 10, in accordance with an embodiment of the present disclosure, includes a controller 130 and a memory device 150. The memory system 110 may be engaged with another device, e.g., a computing device.

The memory device 150 may include a plurality of nonvolatile memory blocks. A nonvolatile memory block may have a structure in which a plurality of nonvolatile memory cells may be coupled through word lines, bit lines, and the like. When a plurality of memory blocks in the memory device 150 are implemented as a type of nonvolatile memory, a memory block capable of storing data may not support a data overwrite operation. Therefore, if any piece of data is not recorded in at least some part of a memory block, a piece of new data may be programmed in the at least some part of the memory block. However, when pieces of data are written on all pages in a specific memory block, another piece of data may not be stored or programmed in that memory block until the pieces of data stored in that memory block are erased.

In addition, the plurality of nonvolatile memory blocks may be divided into a plurality of regions. By way of example but not limitation, the memory device 150 lay be divided into a system region storing system information and a data region storing user data. The system region may not be directly accessible to a user. A nonvolatile memory block included in the system region may store firmware, map information, logs, history information and the like. On the other hand, another nonvolatile memory block included in the data area may store user data which may be inputted by a user, or from a host, or outputted in response to a user's request or a host's request. According to an embodiment, some system information may be stored with the corresponding user data in the same nonvolatile memory block.

In an embodiment, the logs or the history information stored in the system area may be stored in a preset location or a position of the plurality of nonvolatile memory blocks included in the system region, while the user data stored in the data area is sequentially stored in the plurality of nonvolatile memory blocks of the data region. The system region and the data region may be controlled in different ways. The system area and the data area may not be mixed or overlapped so that the system area and the data area are stored in different memory blocks individually. However, according to an embodiment, a memory block may be re-allocated for the system region or the data region after all of the data stored in the memory block is erased.

The controller 130 may program or store a new piece of data, or read or erase a piece of data stored in the memory device 150. The controller 130 may support a data input/output (I/O) operation such as programming, reading and/or erasing data. Further, the controller 130 may monitor power supplied to the memory system 110 and perform a preset operation corresponding to a situation when the power is not normally supplied.

In an embodiment, the controller 130 may detect power-on 312 and power-off 314. A power detector 316 in the controller 130 may check or monitor whether the power supplied to the controller 130 is lower than a preset level. Here, the preset level may be a minimum level required for stable operation within the memory system 110. When the power supplied to the memory system 110 is higher than the preset level, the power detector 316 may recognize that the supplied power is stable. The power detector 316 may output a normal power status NORMAL_POWER as a monitoring result, when the supplied power is stable. On the other hand, when the power is lower than the preset level or the power is not supplied, the power detector 316 may determine that the supplied power is unstable and, output an abnormal power state LOW_POWER.

In the embodiment described with reference to FIG. 1, the controller 130 includes the power detector 316. But, according to another embodiment, the power detector 316 may be arranged outside the controller 130.

While power is supplied, a command, a piece of data and the like may be delivered to the memory system 110 from another device (e.g., a host, etc.), However, when the power is suddenly interrupted (e.g., a sudden power-off, SPO) so that the power is not sufficiently supplied, the memory system 110 may not perform a data input/output (I/O) operation normally. When the power is cut off while the memory system 110 performs an operation corresponding to a command, data and etc, which was inputted from another device, the operation performed by the memory system 110 may be stopped or hafted.

To enhance or improve reliability in operational engagement with another device, when the power is resumed (i.e., supplied again) after the operation performed in the memory system 110 is stopped or halted because of a sudden power-off (SPO), it might be necessary that the memory system 110 restores to a previous status before the power is suddenly interrupted. When the memory system 110 does not revert to the previous status before the power is interrupted, some operations such as storing data required by a user or a host may disappear without a trace.

The memory system 110 may sequentially record or store an event or the like corresponding to an operation requested from another device. For example, a plurality of events corresponding to inputted requests or commands may be stored in a data structure such as a queue, and the plurality of events may be handled or processed by event handling circuitry 324.

As used in this disclosure, the term 'circuitry' may refer to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to a particular claim element, an integrated circuit for a storage device.

When it might be expected or monitored that the power is not supplied or the power is not stably supplied, the memory system 110 may prepare to store information about a situation before the power is halted or stopped, so as to perform a recovery operation after the power is supplied again or resumed. According to an embodiment, not shown in FIG. 1, the memory system 110 may use reserved power for this operation. Such information for the recovery operation may include a log or history information. The log or the history information may include a plurality of events which may be stored in a data structure such as a queue. The plurality of events may include a first task that has been running when the power is interrupted, a second task to be scheduled, and a third task that had already been executed but its response has not answered yet to another device (e.g., a host), In order to improve or ensure operational reliability between the memory system 110 and another device and avoid a superfluous operation, the memory system 110 may store the third task in the log or the history information.

In an embodiment, the log or the history information may be configured by backup circuitry 318. For example, when receiving the abnormal power state LOW_POWER from the power detector 316, the backup circuitry 318 may use an electric energy stored in an auxiliary device to generate the log or the history information. Although not shown, the auxiliary device may include a capacitor or the like, which is capable of preserving a minimal electrical energy used by the backup circuitry 318 and the event handling circuitry 324 involved in preparation for a recovery operation.

When the backup circuitry 318 generates the log or the history information, the event handling circuitry 324 is configured to store the log or the history information in the memory device 150. After the event handling circuitry 324 stores the log or the history information in the memory device 150, the memory system 110 may be in the power-off 314.

Figure 2:
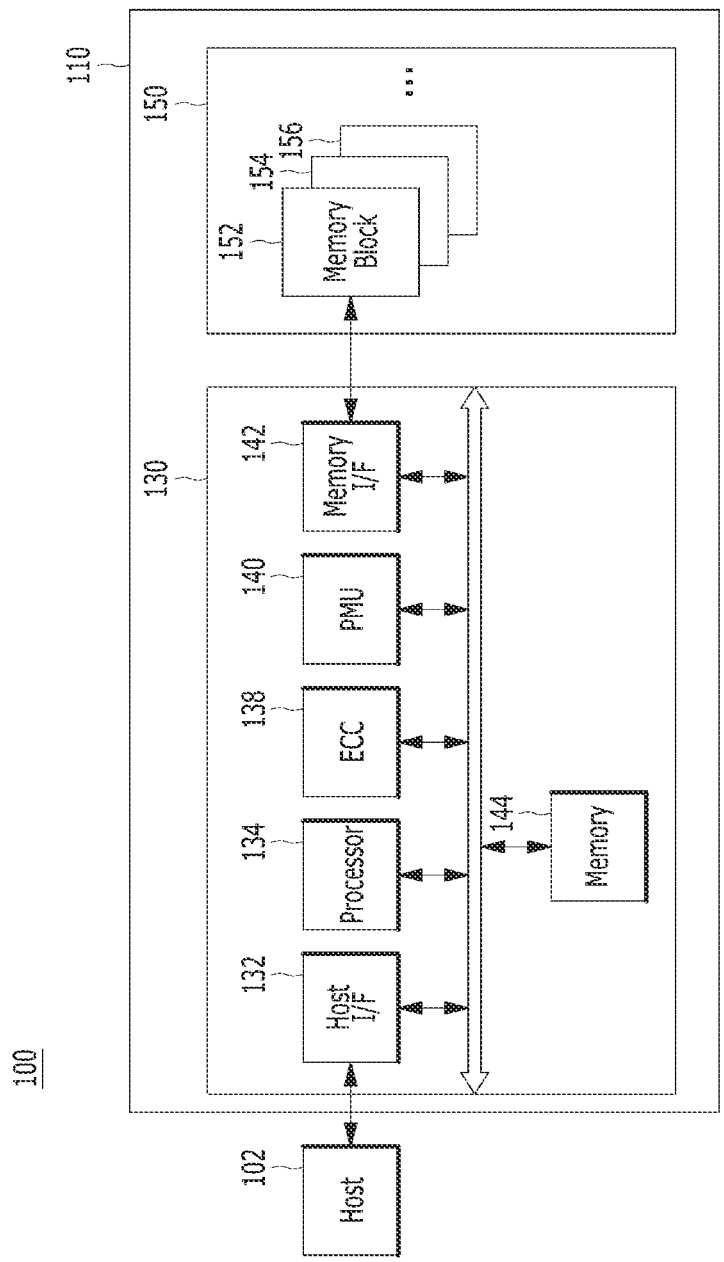
FIG. 2 illustrates a memory system according to another embodiment of the present disclosure.
Figure 3:
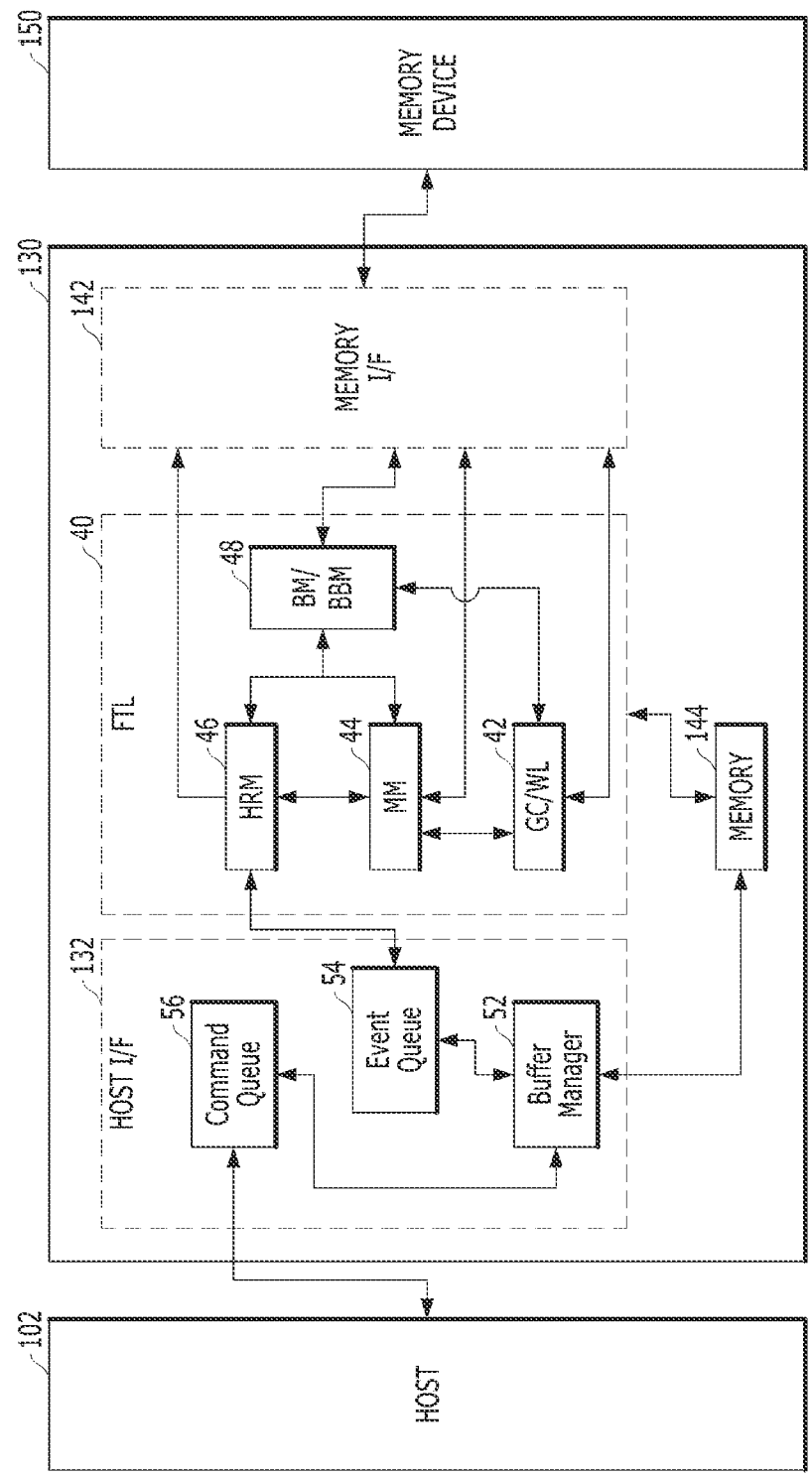
FIG. 3 illustrates a controller within a memory system according to another embodiment of the present disclosure.

When the power is resumed after being interrupted, the controller 130 may load system information such as firmware and map information stored in the memory device 150 into a memory 144 shown in FIGS. 2 and 3, and transfer the log or the history information, stored before the power is interrupted or halted, from the memory device 150.

For example, when the memory system 110 is diverted from the power-off 314 to the power-on 312, recovery circuitry 322 in the controller 130 may load the log or the history information stored in the memory device 150 through the event handling circuitry 324 and store the log or the history information into the memory 144. The event handling circuitry 324 may sequentially perform events stored in the log or the history information so that the memory system 110 may be restored, i.e., turned back to an operational status before the power is interrupted.

According to an embodiment, the backup circuitry 318 and the recovery circuitry 322 may be implemented with a logic circuit or a program algorithm. By way of example but not limitation, the backup circuitry 318 and the recovery circuitry 322 may be included in system firmware when implemented with a program algorithm. The operations of the backup circuitry 318 and the recovery circuitry 322 may be automatically performed whenever the supplied power is interrupted and an operation of the memory system 110 is abnormally halted. When the power is stopped after the memory system 110 has normally processed all events corresponding to operations requested or scheduled, the recovery circuitry 322 may not perform a recovery operation.

For example, supplied power may be unstable in an operating environment of the memory system 110. As an example of an unstable operating environment, power is not sufficiently supplied, or a power supply device works abnormally or unstably in a computing device or a data processing system in which the memory system 110 is mounted. In these cases, the memory system 110 may repeatedly perform the recovery operation whenever the power is supplied again or resumed. Each time a recovery operation is repeatedly performed.

The recovery operation performs an event included in the logs or the history information. If the recovery operation is repeated, the same task may be repeatedly performed. Some repeated executions of the same task may not cause problems for the memory system 110. But, when a task included in the log or the history information requires access to a specific memory block in the memory device 150, the specific memory block may have been repeatedly accessed by the controller 130 for the recovery operation, so that characteristics or properties of the specific memory block, which may be shown as a read count or an erase count, may be deteriorated. For example, if the power is unstable and the recovery operations are repeatedly performed, it is highly probable that an operation for accessing a specific open memory block is also repeated.

In FIG. 2, a data processing system 100 in accordance with an embodiment of the present disclosure may include a host 102 engaged or operably coupled with a memory system 110.

The host 102 may include, for example, any of a variety of portable electronic devices, such as a mobile phone, an MP3 player and a laptop computer, or an electronic device such as a desktop computer, a game player, a television (TV), a projector and the like.

The host 102 also includes at least one operating system (OS), which may generally manage, and control, functions and operations performed in the host 102. The OS may provide interoperability between the host 102 engaged with the memory system 110 and the user of the memory system 110. The OS may support functions and operations corresponding to user's requests. By way of example but not limitation, the OS may include a general operating system and a mobile operating system according to mobility of the host 102. The general operating system may be split into a personal operating system and an enterprise operating system according to system requirements or a user's environment. The personal operating system, including Windows and Chrome, may be subject to support services for general purposes. But the enterprise operating systems can be specialized for securing and supporting high performance, including Windows servers, Linux, Unix and the like. Further, the mobile operating system may include an Android, an iOS, a Windows mobile and the like. The mobile operating system may be subject to support services or functions for mobility (e.g., a power saving function), The host 102 may include a plurality of operating systems. The host 102 may execute multiple operating systems interlocked with the memory system 110, corresponding to a user's request. The host 102 may transmit a plurality of commands corresponding to the users requests into the memory system 110, thereby performing operations corresponding to commands within the memory system 110. Handling plural commands in the memory system 110 is described below with reference to FIGS. 4 and 5.

The memory system 110 may operate or perform a specific function or operation in response to a request from the host 102 and, particularly, may store data to be accessed by the host 102. The memory system 110 may be used as a main memory system or an auxiliary memory system of the host 102. The memory system 110 may be implemented with any of various types of storage devices, which may be electrically coupled with the host 102, according to a protocol of a host interface. Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device, for example, a dynamic random access memory (DRAM) and a static RAM (SRAM), and/or a nonvolatile memory device such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM or ReRAM) and a flash memory.

The memory system 110 may include a controller 130 and a memory device 150. The memory device 150 may store data to be accessed by the host 102. The controller 130 may control storage of data in the memory device 150.

The controller 130 and the memory device 150 may be integrated into a single semiconductor device, which may be included in any of the various types of memory systems as listed above.

By way of example but not limitation, the controller 130 and the memory device 150 may be integrated into a single semiconductor device. The controller 130 and memory device 150 may be so integrated to form an SSD for improving operation speed. When the memory system 110 is used as an SSD, the operating speed of the host 102 connected to the memory system 110 can be improved more than that of the host 102 connected with a hard disk. In another embodiment, the controller 130 and the memory device 150 may be integrated into one semiconductor device to form a memory card, such as a PC card (PCMCIA), a compact flash card (CF), a smart media card (SM, SMC), a memory stick, a multimedia card (MMC, RS-MMC, MMC-micro), a SD card (SD, miniSD, microSD, SDHC), or a universal flash memory.

The memory system 110 may be configured as a part of, for example, a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various components configuring a computing system.

The memory device 150 may be a nonvolatile memory device and may retain data stored therein even while an electrical power is not supplied. The memory device 150 may store data provided from the host 102 through a write operation, while providing data stored therein to the host 102 through a read operation. The memory device 150 may include a plurality of memory blocks 152, 154, 156, each of which may include a plurality of pages. Each of the plurality of pages may include a plurality of memory cells to which a plurality of word lines (WL) are electrically coupled. The memory device 150 also includes a plurality of memory dies, each of which includes a plurality of planes, each of which includes memory blocks, among the plurality of memory blocks 152, 154, 156. In addition, the memory device 150 may be a nonvolatile memory device, for example a flash memory, wherein the flash memory may be a three-dimensional stack structure.

The controller 130 may control overall operations of the memory device 150, such as read, write, program and erase operations. For example, the controller 130 may control the memory device 150 in response to a request from the host 102. The controller 130 may provide the data, read from the memory device 150, to the host 102. The controller 130 may store the data, provided by the host 102, into the memory device 150.

The controller 130 may include a host interface (I/F) 132, a processor 134, an error correction code (ECC) unit 138, a power management unit (PMU) 140, a memory interface (I/F) 142 and a memory 144, all operatively coupled via an internal bus.

The host interface 132 may process commands and data provided from the host 102, and may communicate with the host 102 through at least one of various interface protocols, such as universal serial bus (USB), multimedia card (MMC), peripheral component interconnect-express (PCI-e or PCIe), small computer system interface (SCSI), serial-attached SCSI (SAS), serial advanced technology attachment (SATA), parallel advanced technology attachment (PATA), small computer system interface (SCSI), enhanced small disk interface (ESDI) and integrated drive electronics (IDE), In accordance with an embodiment, the host interface 132 is a component for exchanging data with the host 102, which may be implemented through firmware called a host interface layer (HIL).

The ECC unit 138 may correct error bits of the data to be processed in (e.g., outputted from) the memory device 150, which may include an ECC encoder and an ECC decoder, Here, the ECC encoder may perform error correction encoding of data to be programmed in the memory device 150 to generate encoded data into which a parity bit is added and store the encoded data an memory device 150. The ECC decoder may detect and correct errors contained in data read from the memory device 150 when the controller 130 reads the data stored in the memory device 150. After performing error correction decoding on the data read from the memory device 150, the ECC unit 138 may determine whether the error correction decoding has succeeded and output an instruction signal (e.g., a correction success signal or a correction fail signal). The ECC unit 138 may use the parity bit which is generated during the ECC encoding process, for correcting the error bit of the read data. When the number of the error bits is greater than or equal to a threshold number of correctable error bits, the ECC unit 138 may not correct error bits but instead may output an error correction fail signal indicating failure in correcting the error bits.

The ECC unit 138 may perform an error correction operation based on a coded modulation such as a low density parity check (LDDC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC unit 138 may include all or some of circuits, modules, systems or devices for performing the error correction operation based on at least one of the above described codes.

The PMU 140 may manage electrical power provided in the controller 130. For example, the PMU 140 may detect the power-on 312 and the power-off 314 described in FIG. 1. In addition, according to an embodiment, the PMU 140 may include the power detector 316 shown in FIG. 1.

The memory interface 142 may serve as an interface for handling commands and data transferred between the controller 130 and the memory device 150, to allow the controller 130 to control the memory device 150 in response to a request delivered from the host 102. The memory interface 142 may generate a control signal for the memory device 150 and may process data entered into or outputted from the memory device 150 under the control of the processor 134 in a case when the memory device 150 is a flash memory and, in particular, when the memory device 150 is a NAND flash memory. The memory interface 142 may provide an interface for handling commands and data between the controller 130 and the memory device 150, for example, operations of NAND flash interface, in particular, operations between the controller 130 and the memory device 150. In accordance with an embodiment, the memory interface 142 may be implemented through firmware called a Flash Interface Layer (FIL) as a component for exchanging data with the memory device 150.

The memory 144 may support operations performed by the memory system 110 and the controller 130. The memory 144 may store temporary or transactional data generated or delivered for operations in the memory system 110 and the controller 130. The controller 130 may control the memory device 150 in response to a request from the host 102. The controller 130 may deliver data read from the memory device 150 into the host 102. The controller 130 may store data entered through the host 102 within the memory device 150, The memory 144 may be used to store data required for the controller 130 and the memory device 150 to perform operations such as read operations or program/write operations.

The memory 144 may be implemented with a volatile memory. The memory 144 may be implemented with a static random access memory (SRAM), a dynamic random access memory (DRAM) or both. Although FIG. 1 illustrates the memory 144 disposed within the controller 130, the present invention is not limited to that arrangement. That is, the memory 144 may be within or external to the controller 130, For instance, the memory 144 may be embodied by an external volatile memory having a memory interface transferring data and/or signals between the memory 144 and the controller 130.

The memory 144 may store data necessary for performing operations such as data writing and data reading requested by the host 102 and/or data transfer between the memory device 150 and the controller 130 for background operations such as garbage collection and wear levelling as described above. In accordance with an embodiment, for supporting operations in the memory system 110, the memory 144 may include a program memory, a data memory, a write buffer/cache, a read buffer/cache, a data buffer/cache, a map buffer/cache, and the like.

The processor 134 may be implemented with a microprocessor or a central processing unit (CPU). The memory system 110 may include one or more processors 134, The processor 134 may control the overall operations of the memory system 110. By way of example but not limitation, the processor 134 may control a program operation or a read operation of the memory device 150, in response to a write request or a read request entered from the host 102. In accordance with an embodiment, the processor 134 may use or execute firmware to control the overall operations of the memory system 110. Herein, the firmware may be referred to as a flash translation layer (FTL). The FTL may serve as an interface between the host 102 and the memory device 150. The host 102 may transmit requests for write and read operations to the memory device 150 through the FTL.

The FTL may manage operations of address mapping, garbage collection, wear-leveling and so forth. Particularly, the FTL may load, generate, update, or store map data. Therefore, the controller 130 may map a logical address, which is entered from the host 102, with a physical address of the memory device 150 through the map data. The memory device 150 may otherwise function as a general storage device to perform a read or write operation because of the address mapping operation. Also, through the address mapping operation based on the map data, when the controller 130 tries to update data stored in a particular page, the controller 130 may program the updated data on another empty page and may invalidate old data of the particular page (e.g., update a physical address, corresponding to a logical address of the updated data, from the particular page to the newly programmed page) due to a characteristic of a flash memory device. Further, the controller 130 may store map data of the new data into the FTL.

For example, when performing an operation requested from the host 102 in the memory device 150, the controller 130 uses the processor 134 implemented as a microprocessor or central processing unit (CPU) or the like. The processor 134 engaged with the memory device 150 may handle instructions or commands corresponding to an inputted command from the host 102. The controller 130 may perform a foreground operation as a command operation, corresponding to a command inputted from the host 102, such as a program operation corresponding to a write command, a read operation corresponding to a read command, an erase/discard operation corresponding to an erase/discard command and a parameter set operation corresponding to a set parameter command or a set feature command with a set command.

For another example, the controller 130 may perform a background operation on the memory device 150 through the processor 134. By way of example but not limitation, the background operation for the memory device 150 includes an operation of copying and storing data in a memory block, among the memory blocks 152, 154, 156 in the memory device 150, to another memory block (e.g., a garbage collection (GC) operation). The background operation may include an operation to move or swap data stored in at least one of the memory blocks 152, 154, 156 in a memory device 150, into at least another of the memory blocks 152, 154, 156 (e.g., a wear leveling (WL) operation). During a background operation, the controller 130 may use the processor 134 for storing the map data stored in the controller 130 to at least one of the memory blocks 152, 154, 156, e.g., a map flush operation. A bad block management operation of checking for bad blocks among the plurality of memory blocks 152, 154, 156 is another example of a background operation performed by the processor 134.

In the memory system 110, the controller 130 performs a plurality of command operations corresponding to a plurality of commands received from the host 102. For example, when performing a plurality of program operations corresponding to plural program commands, a plurality of read operations corresponding to plural read commands and a plurality of erase operations corresponding to plural erase commands sequentially, randomly or alternatively, the controller 130 may determine which channel(s) or way(s) for connecting the controller 130 to which memory die(s) in the memory 150 is/are proper or appropriate for performing each operation. The controller 130 may send or transmit data or instructions via the determined channel(s) or way(s) for performing each operation. The plurality of memory dies may transmit an operation result via the same channel(s) or way(s), respectively, after each operation is complete. Then, the controller 130 may transmit a response or an acknowledge signal to the host 102. In an embodiment, the controller 130 may check a status of each channel or each way. In response to a command received from the host 102, the controller 130 may select at least one channel or way based on the status of each channel or each way so that instructions and/or operation results with data may be delivered via selected channel(s) or way(s).

By way of example but not limitation, the controller 130 may recognize statuses regarding channels (or ways) associated with memory dies in the memory device 150. The controller 130 may determine each channel or each way as being in a busy state, a ready state, an active state, an idle state, a normal state, or an abnormal state. The controller's determination of which channel or way an instruction (and/or a data) is delivered through may be based on a physical block address, e.g., to which die(s) the instruction (and/or the data) is delivered. The controller 130 may refer to descriptors delivered from the memory device 150. The descriptors can include a block or page of parameters that describe informative items about the memory device 150, which is a data with a set format or structure. For instance, the descriptors may include device descriptors, configuration descriptors, unit descriptors, and the like. The controller 130 may refer to, or use, the descriptors to determine which channel(s) or way(s) an instruction or a data is exchanged with.

A management unit (not shown) may be included in the processor 134, The management unit may perform bad block management of the memory device 150. The management unit may find bad memory blocks, which are in unsatisfactory condition for further use, as well as perform bad block management on the bad memory blocks. When the memory device 150 is a flash memory, for example, a NAND flash memory, a program failure may occur during the write operation, for example, during the program operation, due to characteristics of a NAND logic function, During the bad block management, the data of the program-failed memory block or the bad memory block may be programmed into a new memory block. The bad blocks may seriously aggravate the utilization efficiency of the memory device 150 having a 3D stack structure and the reliability of the memory system 110. Thus, reliable bad block management may enhance or improve performance of the memory system 110.

Referring to FIG. 3, a controller in a memory system in accordance with another embodiment of the present disclosure is described in detail. The controller 130 cooperates with the host 102 and the memory device 150, The controller 130 may include a host interface 132, a flash translation layer (FTL) unit 240, a memory interface 142 and a memory 144.

Although not shown in FIG. 3, in accordance with an embodiment, the ECC unit 138 described in FIG. 2 may be included in the flash translation layer (FTL) unit 240, In another embodiment, the ECC unit 138 may be implemented as a separate module, a circuit, firmware or the like, which is included in, or associated with, the controller 130.

The host interface 132 is for handling commands, data, and the like transmitted from the host 102, By way of example but not limitation, the host interface 132 may include a command queue 56, a buffer manager 52 and an event queue 54. The command queue 56 may sequentially store commands, data, and the like transmitted from the host 102 and output them to the buffer manager 52 in a stored order. The buffer manager 52 may classify, manage or adjust the commands, the data, and the like, which are delivered from the command queue 56. The event queue 54 may sequentially transmit events for processing the commands, the data, and the like transmitted from the buffer manager 52.

A plurality of commands or data of the same characteristic may be continuously transmitted from the host 102, or commands and data of different characteristics may be transmitted to the memory system 110 after being mixed or jumbled. For example, a plurality of commands for reading data (read commands) nay be delivered, or commands for reading data (read command) and programming/writing data (write command) may be alternately transmitted to the memory system 110. The host interface 132 may store commands, data, and the like, which are transmitted from the host 102, to the command queue 56 sequentially. Thereafter, the host interface 132 may estimate or predict what type of internal operation the controller 130 will perform according to the characteristics of the command, data, etc., which is transmitted from the host 102. The host interface 132 may determine a processing order and a priority of commands, data and the like, based at least on their characteristics. According to characteristics of commands, data, and the like transmitted from the host 102, the buffer manager 52 in the host interface 132 is configured to determine whether the buffer manager should store commands, data, and the like in the memory 144, or whether the buffer manager should deliver the commands, the data, and the like into the flash translation layer (FTL) unit 240, The event queue 54 receives events, entered from the buffer manager 52, which are to be internally executed and processed by the memory system 110 or the controller 130 in response to the commands, the data, etc. transmitted from the host 102, to deliver the events into the flash translation layer (FTL) unit 240 in the order received.

In accordance with an embodiment, the host interface 132 described in FIG. 3 may perform the functions of the controller 130 described in FIG. 1.

In accordance with an embodiment, the flash translation layer (FTL) unit 240 may include a host request manager (HRM) 46, a map manager (MM) 44, a state manager 42 and a block manager 48, The host request manager (HRM) 46 may manage the events entered from the event queue 54. The map manager (MM) 44 may handle or control a map data. The state manager 42 may perform garbage collection or wear leveling. The block manager 48 may execute commands or instructions onto a block in the memory device 150.

By way of example but not limitation, the host request manager (HRM) 46 may use the map manager (MM) 44 and the block manager 48 to handle or process requests according to the read and program commands, and events which are delivered from the host interface 132, The host request manager (HRM) 46 may send an inquiry request to the map data manager (MM) 44, to determine a physical address corresponding to the logical address which is entered with the events. The host request manager (HRM) 46 may send a read request with the physical address to the memory interface 142, to process the read request (handle the events). On the other hand, the host request manager (HRM) 46 may send a program request (write request) to the block manager 48, to program entered data to an empty page (having no data) in the memory device 150, and then, may transmit a nap update request corresponding to the program request to the map manager (MM) 44, to update an item relevant to the programmed data in information of mapping the logical-physical addresses to each other.

Here, the block manager 48 may convert a program request delivered from the host request manager (HRM) 46, the map data manager (MM) 44, and/or the state manager 42 into a flash program request used for the memory device 150, to manage flash blocks in the memory device 150. In order to maximize or enhance program or write performance of the memory system 110 (see FIG. 2), the block manager 48 may collect program requests and send flash program requests for multiple-plane and one-shot program operations to the memory interface 142. The block manager 48 may send several flash program requests to the memory interface 142 to enhance or maximize parallel processing of the multi-channel and multi-directional flash controller.

On the other hand, the block manager 48 may manage blocks in the memory device 150 according to the number of valid pages, select and erase blocks having no valid pages when a free block is needed, and select a block including the least number of valid pages when it is determined that garbage collection is necessary. The state manager 42 may perform garbage collection to move the valid data to an empty block and erase remaining data in the blocks from which the valid data was moved so that the block manager 48 may have enough free blocks (empty blocks with no data). If the block manager 48 provides information regarding a block to be erased to the state manager 42, the state manager 42 is able to check all flash pages of the block to be erased to determine whether each page is valid. For example, to determine validity of each page, the state manager 42 may identify a logical address recorded in an out-of-band (OOB) area of each page, To determine whether each page is valid, the state manager 42 may compare the physical address of the page with the physical address mapped to the logical address obtained from the request. The state manager 42 sends a program request to the block manager 48 for each valid page. A mapping table may be updated through the update of the map manager 44 when the program operation is complete.

The map manager 44 may manage a logical-physical mapping table. The map manager 44 may process requests such as queries, updates, and the like, which are generated by the host request manager (HRM) 46 or the state manager 42. The map manager 44 may store the entire mapping table in the memory device 150 (e.g., a flash/non-volatile memory) and cache mapping entries according to the storage capacity of the memory 144. When a map cache miss occurs while processing inquiry or update requests, the map manager 44 may send a read request to the memory interface 142 to load a relevant mapping table stored in the memory device 150. When the number of dirty cache blocks in the map manager 44 exceeds a certain threshold, a program request may be sent to the block manager 48 so that a clean cache block is made and the dirty map table may be stored in the memory device 150.

On the other hand, when garbage collection is performed, the state manager 42 copies valid page(s) into a free block, and the host request manager (HRM) 46 may program the latest version of the data for the same logical address of the page and currently issue an update request. When the status manager 42 requests the map update in a state in which copying of valid page(s) has not been completed, the map manager 44 may not perform the mapping table update. This is because the map request is issued with old physical information if the status manger 42 requests a map update and a valid page copy is not completed until later. The map manager 44 may perform a map update operation to ensure accuracy only if the latest map table still points to the old physical address.

In accordance with an embodiment, at least one of the state manager 42, the map manager 44 and the block manager 48 may include the operation information confirmation circuitry 124 shown in FIG. 1.

The memory device 150 may include a plurality of memory blocks. The plurality of memory blocks may be different types of memory blocks, such as a single level cell (SLC) memory block or a multi level cell (MLC) memory block, according to the number of bits that may be stored or represented in one memory cell of such block. Here, the SLC memory block includes a plurality of pages implemented by memory cells, each storing one bit of data. The SLC memory block may have high data I/O operation performance and high durability. The MLC memory block includes a plurality of pages implemented by memory cells, each storing multi-bit data (e.g., two bits or more). The MLC memory block may have a larger storage capacity for the same space compared to the SLC memory block. The MLC memory block may be highly integrated in terms of storage capacity. In an embodiment, the memory device 150 may be implemented with MLC memory blocks, such as a double level cell memory block, a triple level cell (TLC) memory block, a quadruple level cell (QLC) memory block and a combination thereof. The double level memory block may include a plurality of pages implemented by memory cells, each capable of storing 2-bit data. The triple level cell (TLC) memory block may include a plurality of pages implemented by memory cells, each capable of storing 3-bit data. The quadruple level cell (QLC) memory block may include a plurality of pages implemented by memory cells, each capable of storing 4-bit data. In another embodiment, the memory device 150 may be implemented with a block including a plurality of pages implemented by memory cells, each capable of storing 5-bit or more bit data.

In an embodiment of the disclosure, the memory device 150 is embodied as a nonvolatile memory such as a flash memory for example a NAND flash memory, a NOR flash memory and the like. In another embodiment, the memory device 150 may be implemented by at least one of a phase change random access memory (PCRAM), a ferroelectrics random access memory (FRAM), a spin injection magnetic memory (e.g., a spin transfer torque magnetic random access memory, STT-MRAM), or the like.

Hereinafter, a write operation and a data recovery operation (sudden power-off recovery (SPOR)) attributable to SPO, which are performed by the memory controller 130 according to an embodiment of the present disclosure, are described with reference to FIG. 4.

A data recovery operation according to an embodiment of the present disclosure is described in detail below. When power is supplied again after SPO, a processor 134 may read, from a memory device 150, data DAT that is stored in the memory device 150 and a write sequence index WT_ORDER and barrier information BR_INF that correspond to the data DAT, and may temporarily store the data DAT, the write sequence index WT_ORDER, and the barrier information BR_INF in a read buffer 144C. The write sequence index WT_ORDER and the barrier information BR_INF may be read from a spare region of the same page in which read data RD DAT has been stored. The read data RD DAT may be consecutive and sequential data.

The processor 134 may detect a "lost write sequence index" indicative of the reception order of a lost write request among plural write sequence indexes WT_ORDER. The lost write sequence index may be a write sequence index corresponding to lost data on which a write operation is not performed by SPO that has occurred while plural pieces of write data WT_DAT are flushed into the memory device 150. That is, lost data is one or more data pieces that may not be flushed into the memory device 150 and thus are lost by the SPO while other data are flushed into the memory device 150. The lost write sequence indexes are the write sequence indexes corresponding to the respective lost data pieces. Furthermore, the processor 134 may make a recovery-impossible decision because the lost data corresponding to the lost write sequence index has not been stored.

The processor 134 may determine, as target data, data for which a write request has been requested later than the detected lost write sequence index. The processor 134 may determine whether a barrier request BR_REQ for first data is received from an external device 102 based on the barrier information BR_INF of each of the first data for which a write request has been requested right before the lost write sequence index and second data for which a write request has been requested right after the lost write sequence index. The processor 134 may determine whether to perform a recovery operation on target data based on whether the barrier request BR_REQ for the first data has been received.

To this end, the processor 134 of the present disclosure may include a data detection circuit 134A, a barrier decision circuit 134B, and a data recovery operation determination circuit 134C.

When power is supplied after SPO, the data detection circuit 134A may read, from the memory device 150, plural pieces of data DAT, and plural write sequence indexes WT_ORDER and plural pieces of barrier information BR_INF corresponding to the plural pieces of data DAT, The plural write sequence indexes WT_ORDER and the plural pieces of barrier information BR_INF may be stored in a spare region of a page in which each of the plural pieces of data DAT is stored.

The data detection circuit 134A may detect a lost write sequence index "M" by using the plural write sequence indexes WT_ORDER having consecutive and sequential values. The data detection circuit 134A may detect first data corresponding to a write sequence index "M−1" and second data corresponding to a write sequence index "M+1."

The barrier decision circuit 134B may detect first barrier information of the first data and second barrier information of the second data by using the plural pieces of barrier information BR_INF. Furthermore, the barrier decision circuit 134B may determine whether a barrier request BR_REQ for the first data, which is received from the external device 102, has been received based on whether the first barrier information and the second barrier information are the same.

The first barrier information may include the accumulated number of barrier requests BR_REQ that have been received before a write request for the first data from the external device 102 is requested. The second barrier information may include the accumulated number of barrier requests BR_REQ that have been received before a write request for the second data from the external device 102 is requested.

Furthermore, the first barrier information may include the write sequence index of data for which a write request has been requested right before a barrier request BR_REQ that has been most recently received, among barrier requests BR_REQ that have been received before a write request for the first data from the external device 102 is requested. The second barrier information may include the write sequence index of data for which a write request has been requested right before a barrier request BR_REQ that has been most recently received, among barrier requests BR_REQ that have been received before a write request for the second data from the external device 102 is requested.

When the first barrier information and the second barrier information are the same, the barrier decision circuit 134B may determine that the barrier request BR_REQ for the first data has not been received from the external device 102. When the first barrier information and the second barrier information are not the same, the barrier decision circuit 134B may determine that the barrier request BR_REQ for the first data has been received from the external device 102.

The data recovery operation determination circuit 134C may determine whether to perform a recovery operation on target data corresponding to a write sequence index "M+1" and thereafter, based on whether the barrier request BR_REQ has been received.

When determining that the barrier request BR_REQ for the first data has been received, the data recovery operation determination circuit 134C may not perform the recovery operation on the target data.

When determining that the barrier request BR_REQ for the first data has not been received, the data recovery operation determination circuit 134C may perform the recovery operation on the target data.

When the first barrier information and the second barrier information are the same, the barrier decision circuit 134B may determine that a barrier request BR_REQ for a data group including the first data has not been received. The barrier decision circuit 134B may recognize that lost data corresponding to a lost write sequence index is not data for which a write request has been requested in the last order, in the data group including the first data. Furthermore, the barrier decision circuit 134B may know that the lost data belongs to the same data group as data that has been read from the memory device 150 and that corresponds to a first write request and a second write request.

That is, the write orders of the lost data and the target data do not need to be guaranteed by the barrier request BR_REQ. Accordingly, the data recovery operation determination circuit 134C may determine that the recovery of the lost data is impossible, and may determine to perform a data recovery operation (SPOR) on the target data.

Furthermore, when the first barrier information and the second barrier information are not the same, the barrier decision circuit 134B may determine that the barrier request BR_REQ for the data group including the first data has been received. The barrier decision circuit 134B may recognize that lost data corresponding to a lost write sequence index may be data for which a write request has been requested in the last order, in a data group including the first data. Furthermore, the barrier decision circuit 134B may know that the lost data does not belong to the same data group as data that has been read from the memory device 150 and that corresponds to a first write request and a second write request.

That is, the write orders of the lost data and the target data may need to be guaranteed by the barrier request BR_REQ. Accordingly, the data recovery operation determination circuit 134C may determine that the recovery of the lost data is impossible, and may determine to not perform a data recovery operation (SPOR) on the target data. Furthermore, the data recovery operation determination circuit 134C may perform invalidation processing on the target data.

In an embodiment of the present disclosure, although the barrier request BR_REQ for the first data is received, the data recovery operation determination circuit 134C may determine whether to perform a recovery operation based on whether the identifiers of the memory device 150 at which the first data and the second data have been stored, respectively, are the same. When the identifiers of the memory device 150 at which the first data and the second data have been stored, respectively, are different from each other, the data recovery operation determination circuit 134C may perform the recovery operation on target data. When the identifiers of the memory device 150 at which the first data and the second data have been stored, respectively, are the same, the data recovery operation determination circuit 134C may not perform the recovery operation on the target data.

The memory controller 130 according to an embodiment of the present disclosure can reduce an unnecessary data recovery operation based on a progress state of a write operation and barrier information, which have been determined based on lost data caused by SPO. Accordingly, overhead which may occur during a read operation of a memory system can be reduced.

The memory controller 130 according to an embodiment of the present disclosure may determine whether to perform a data recovery operation based on barrier information that is not influenced by SPO and that has been stored in a nonvolatile memory device 150. Accordingly, the reliability of a data recovery operation can be improved.

The memory controller 130 according to an embodiment of the present disclosure may determine whether to perform a recovery operation based on a progress state of a write operation and barrier information although the write operation is performed without taking into consideration the write order of data based on a barrier request received from a host. Accordingly, a write operation time can be reduced by the time taken to guarantee the write order.

Hereinafter, a detailed example of a write operation that is performed by the memory controller 130 according to an embodiment of the present disclosure is described with reference to FIGS. 5 to 8.

Figure 4:
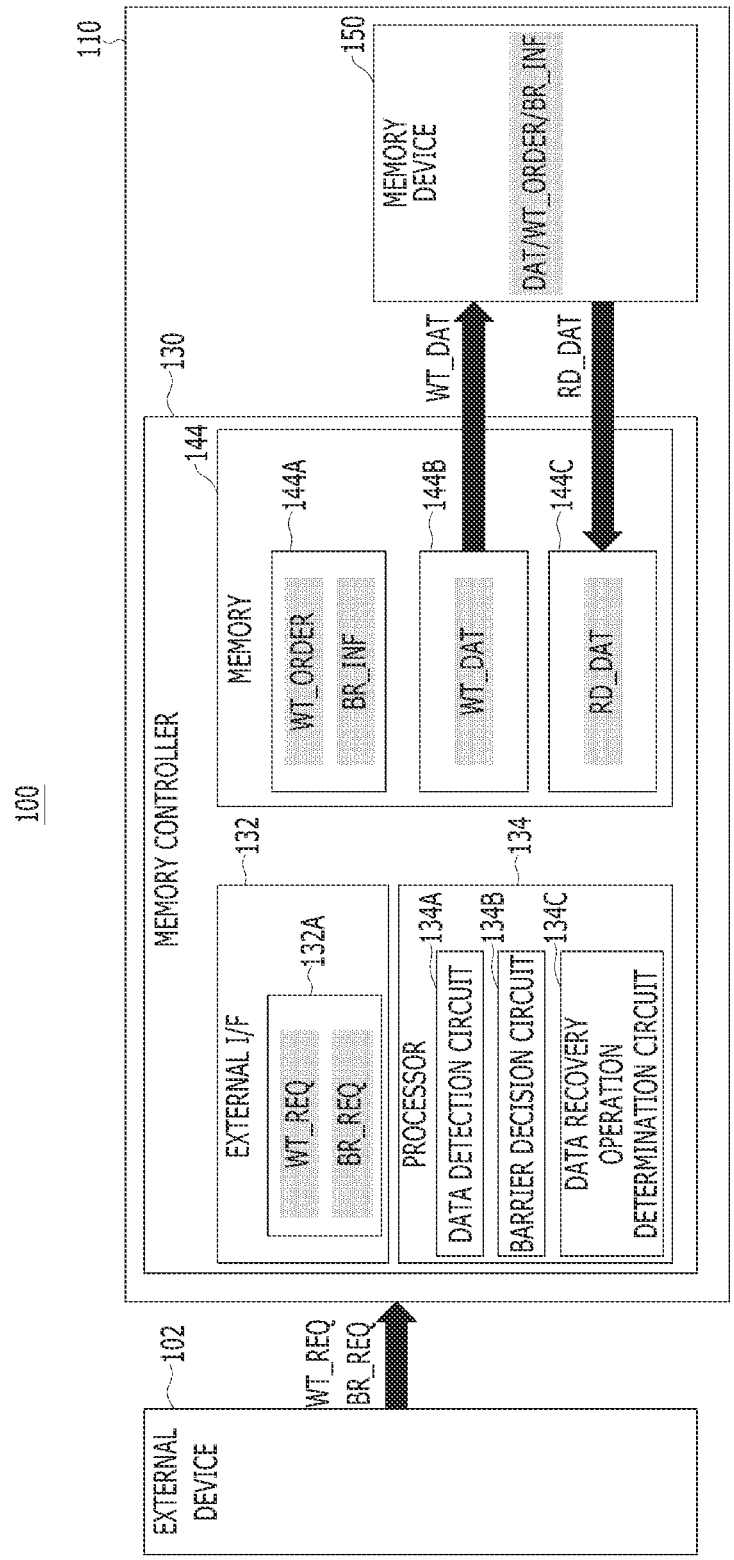
FIG. 4 is a diagram schematically illustrating a data processing system according to an embodiment of the present disclosure.
Figure 5:
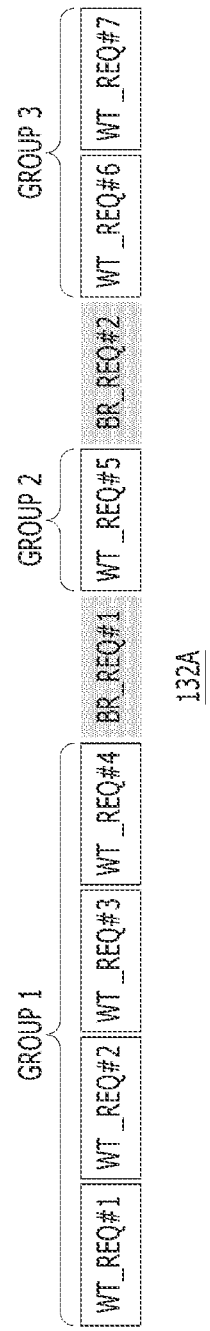
FIG. 5 illustrates a detailed example of a plurality of requests that are stored based on a reception order according to an embodiment of the present disclosure.

FIG. 5 illustrates an example of a plurality of write requests and a plurality of barrier requests that have been stored in a queue buffer (132A in FIG. 4) in accordance with an embodiment of the present disclosure. FIGS. 6A and 6B illustrate examples of a write sequence index and barrier information that have been stored in a temporary buffer (144A in FIG. 4) in accordance with an embodiment of the present disclosure. FIG. 7 illustrates an example of plural pieces of data that have been stored in a write buffer (144B in FIG. 4) and plural write sequence indexes and plural pieces of barrier information corresponding to the plural pieces of data in accordance with an embodiment of the present disclosure. FIG. 8 illustrates an example of plural pieces of data that have been stored in the memory device 150 and plural write sequence indexes and plural pieces of barrier information corresponding to the plural pieces of data in accordance with an embodiment of the present disclosure.

As illustrated in FIG. 5, the memory controller 130 may store a plurality of write requests WT_REQ #1 to WT_REQ #7 and a plurality of barrier requests BR_REQ #1 and BR_REQ #2 that are received from the external device 102 in a way to be aligned based on their reception order.

In this case, the first barrier request BR_REQ #1 may be a request for guaranteeing that the first to fourth write requests WT_REQ #1 to WT_REQ #4 that are included in a first group GROUP1 are stored in the memory device 150 earlier than the fifth write request WT_REQ #5 that is included in a second group GROUP2. Accordingly, the first barrier request BR_REQ #1 may be received right after the fourth write request WT_REQ #4, that is, the last write request that is included in the first group GROUP1, is received.

The second barrier request BR_REQ #2 may be a request for guaranteeing that the first to fifth write requests WT_REQ #1 to WT_REQ #5 that are included in the first group GROUP1 and the second group GROUP2 are stored in the memory device 150 earlier than the sixth and seventh write requests WT_REQ #6 and WT_REQ #7 that are included in a third group GROUP3. The second barrier request BR_REQ #2 may be received right after the fifth write request WT_REQ #5, that is, the last write request that is included in the second group GROUP2, is received.

The memory controller 130 may perform a write operation on plural pieces of data corresponding to the first to seventh write requests WT_REQ #1 to WT_REQ #7, based on write orders based on the first and second barrier requests BR_REQ #1 and BR_REQ #2. To this end, as illustrated in FIGS. 6A and 6B, the memory controller 130 may generate a write sequence index WT_ORDER and barrier information BR_INF corresponding to a write request WT_REQ that is received from the external device 102.

Referring to FIGS. 6A and 6B, the write sequence index WT_ORDER may indicate the order in which a plurality of write requests WT_REQ have been received from the external device 102, That is, first to seventh write sequence indexes #1 to #7 may be reception orders in which the first to seventh write requests WT_REQ #1 to WT_REQ #7 have been received, respectively, from the external device 102. Furthermore, the first to seventh write sequence indexes #1 to #7 may be orders in which write requests for first to seventh data corresponding to the first to seventh write requests WT_REQ #1 to WT_REQ #7 have been requested, respectively, by the external device 102.

The barrier information BR_INF of the present disclosure may indicate whether a received barrier request BR_REQ is present before a write request WT_REQ corresponding to the barrier information BR_INF is received.

For example, as illustrated in FIGS. 6A and 6B, the barrier information BR_INF of "0" may indicate that a received barrier request BR_REQ is not present before write requests WT_REQ corresponding to the respective write sequence indexes WT_ORDER "#1" "#2", "#3", and "#4" corresponding to the barrier information BR_INF of "0" are received. In contrast, barrier information BR_INF having a value (e.g., #1, #2, #3, #4, or #5) not "0" may indicate that a received barrier request BR_REQ is present before write requests WT_REQ corresponding to the respective write sequence indexes WT_ORDER "#5", "#6", and "#7" corresponding to the barrier information BR_INF having the value are received.

Furthermore, the barrier information BR_INF may include the accumulated number of barrier requests BR_REQ that have been received before a write request WT_REQ corresponding to the barrier information BR_INF is received.

For example, as illustrated in FIG. 6A, the barrier information BR_INF corresponding to the write sequence index WT_ORDER "#5" may be 1. That is, before the fifth write request WT_REQ #5 that has been received for the fifth time is received, the accumulated number of barrier requests BR_REQ received may be 1, (BR_REQ #1 in FIG. 5), Namely, this may indicate that the number of barrier requests BR_REQ that are received between first timing at which the first write request WT_REQ #1 is received and second timing at which the fifth write request WT_REQ #5 is received is 2.

The barrier information BR_INF corresponding to the write sequence index WT_ORDER "#6" may be 2. That is, before the sixth write request WT_REQ #6 that has been received for the sixth time is received, the accumulated number of barrier requests BR_REQ received may be 2. (BR_REQ #1 and BR_REQ #2 in FIG. 5). This may indicate that the number of barrier requests BR_REQ that are received between first timing at which the first write request WT_REQ #1 is received and second timing at which the sixth write request WT_REQ #6 is received is 2.

Furthermore, barrier information BR_INF of the present disclosure may include timing at which a barrier request that has been most recently received, among barrier requests BR_REQ received before a write request WT_REQ corresponding to the barrier information BR_INF is received, is received.

For example, as illustrated in FIG. 6B, the barrier information BR_INF corresponding to the write sequence index WT_ORDER "#5" may be #4. That is, this may indicate that a barrier request BR_REQ that has been most recently received, among barrier requests BR_REQ received before the fifth write request WT_REQ #5 is received, is received right after the fourth write request WT_REQ #4 is received (BR_REQ #1 in FIG. 5). This may indicate that the barrier request BR_REQ has been received between first timing at which the fourth write request WT_REQ #4 is received and second timing at which the fifth write request WT_REQ #5 is received.

Furthermore, the barrier information BR_INF corresponding to the write sequence index WT_ORDER "#6" may be #5. That is, this may indicate that a barrier request BR_REQ that has been most recently received, among barrier requests BR_REQ received before the sixth write request WT_REQ #6 is received, is received right after the fifth write request WT_REQ #5 is received (BR_REQ #1 in FIG. 5). This may indicate that the barrier request BR_REQ has been received between first timing at which the fifth write request WT_REQ #5 is received and second timing at which the sixth write request WT_REQ #6 is received.

As illustrated in FIG. 7, the write buffer 144B of the present disclosure may include first to third write buffers WT_BUFFER1 to WT_BUFFER3, The memory controller 130 may store, in the first to third write buffers WT_BUFFER1 to WT_BUFFER3, the write sequence index WT_ORDER and the barrier information BR_INF described with reference to FIGS. 6A and 6B along with plural pieces of data DAT for which a write request has been requested from the external device 102.

The memory controller 130 may need to perform a flushing operation based on a scheduling policy of each of the first to third write buffers WT_BUFFER1 to WT_BUFFER3. Accordingly, the plural pieces of data DAT that are stored in the plurality of first to third write buffers WT_BUFFER1 to WT_BUFFER3 may not be flushed into the memory device 150 in order of the write request. The memory controller 130 according to an embodiment of the present disclosure may determine whether to perform a recovery operation based on a progress state of a write operation and barrier information, although the write operation is performed without taking into consideration the write order of data based on a barrier request received from a host. Accordingly, a write operation time can be reduced by the time taken to guarantee the write order.

As illustrated in FIG. 8, the memory controller 130 may flush, into the memory device 150, first to seventh data DAT1<#1/0> to DAT7<#7/2> that have been temporarily stored in the first to third write buffers WT_BUFFER1 to WT_BUFFER3. In this case, the write sequence index WT_ORDER and the barrier information BR_INF may be stored in a spare region of a page in which the data DAT has been stored.

Figure 9A:
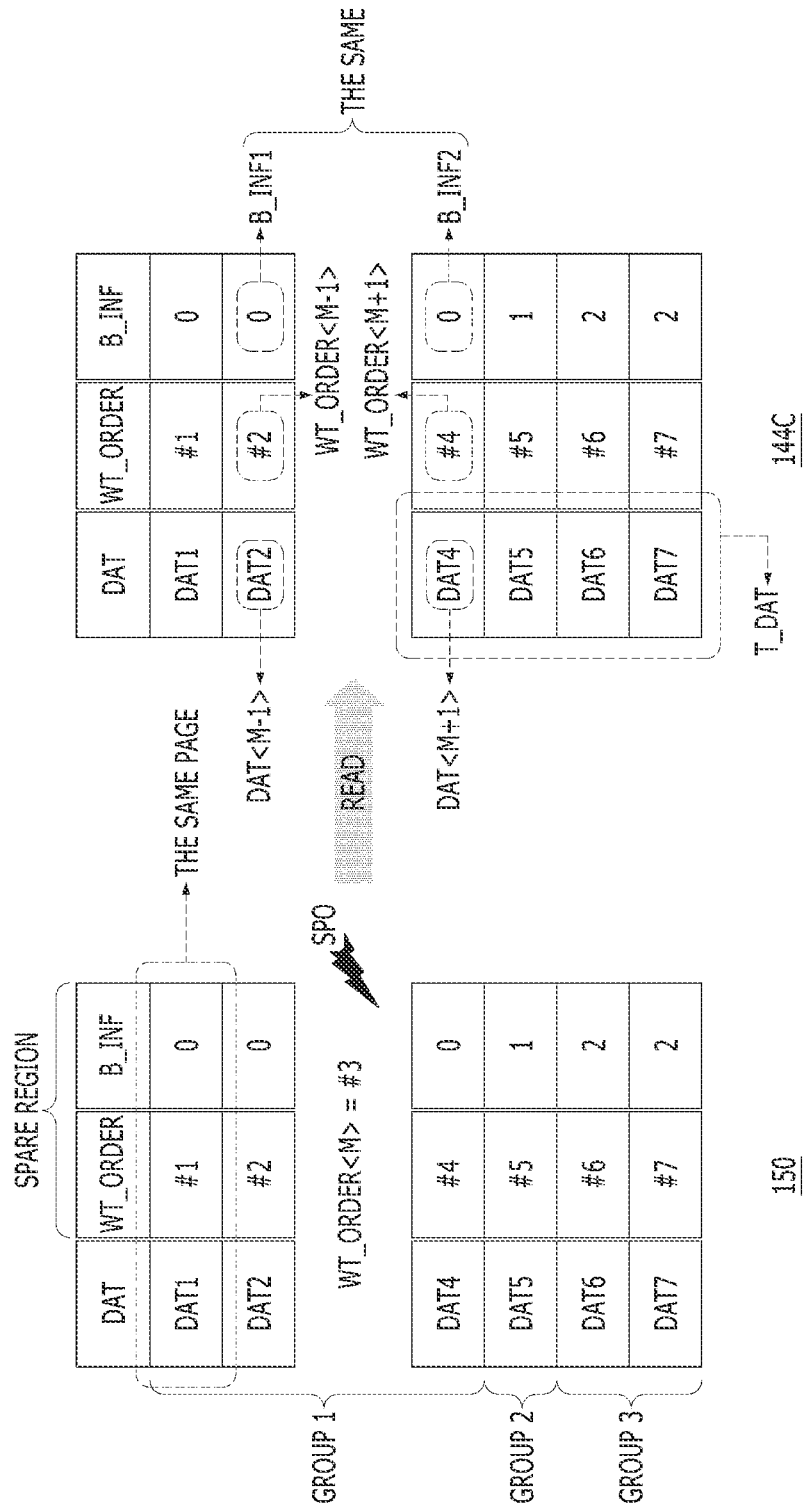
FIGS. 9A and 9B illustrate detailed examples of an operation of determining, by the memory controller, whether to perform a data recovery operation according to an embodiment of the present disclosure.
Figure 9B:
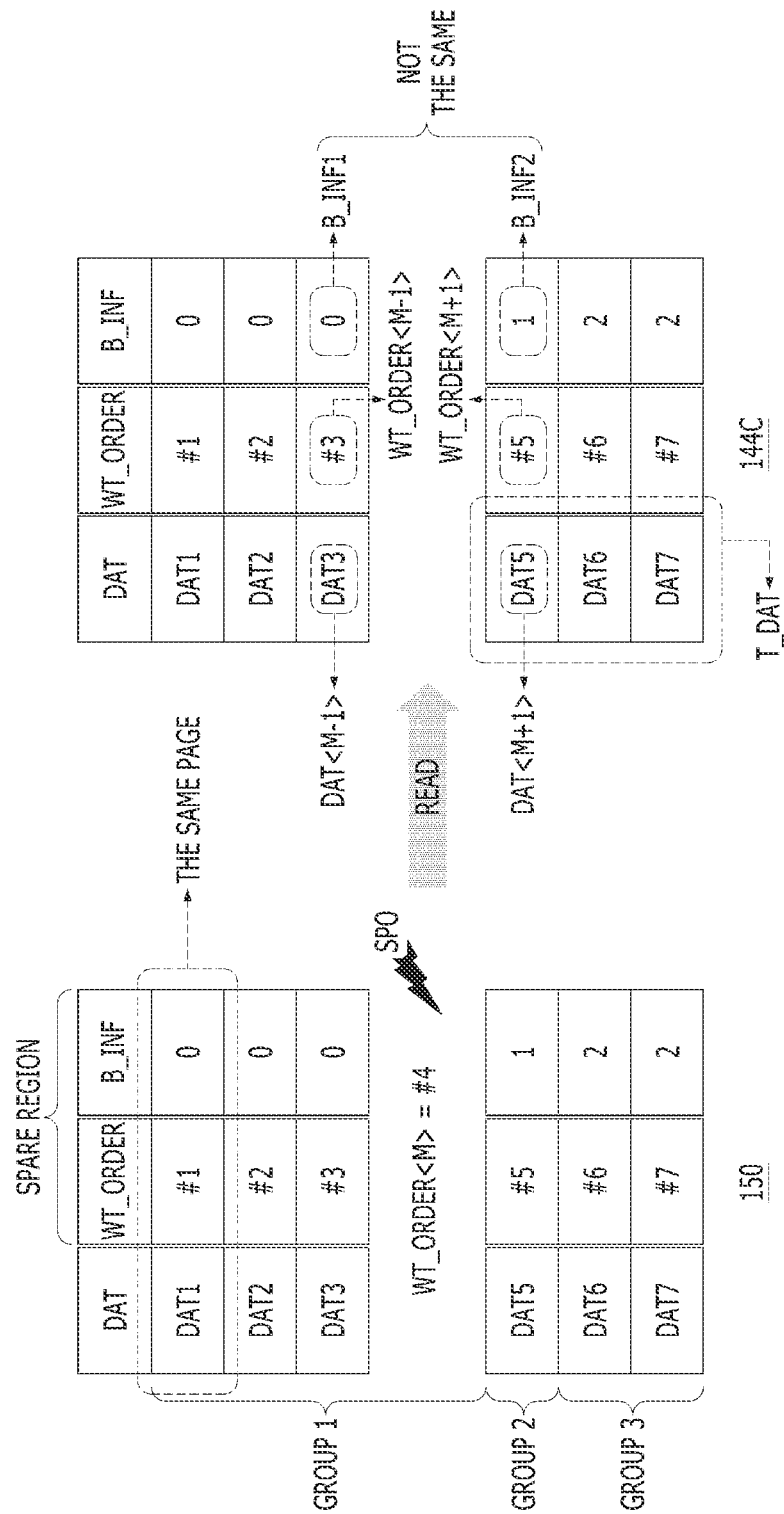

FIGS. 9A and 9B illustrate detailed examples of a method of determining, by the memory controller 130 according to an embodiment of the present disclosure, whether to perform a data recovery operation (SPOR).

Hereinafter, a detailed example of a method of determining to perform a data recovery operation (SPOR) on target data is described with reference to FIG. 9A.

The memory controller 130 may read, from the memory device 150, plural pieces of data DAT that have been stored in the memory device 150 and a write sequence index WT_ORDER and barrier information BR_INF corresponding to each of the plural pieces of data DAT, and may temporarily store the plural pieces of data DAT, the write sequence index WT_ORDER, and the barrier information BR_INF in the read buffer (144C in FIG. 4).

For example, the memory controller 130 may read, from the memory device 150, plural pieces of data DAT1 to DAT2 and DAT4 to DAT7 that have been stored in the memory device 150 and write sequence indexes #1 to #2 and #4 to #7 and barrier information (0, 0, 0, 1, 2, 2) corresponding to the plural pieces of data DAT1 to DAT2 and DAT4 to DAT7, respectively, and may temporarily store the plural pieces of data DAT1 to DAT2 and DAT4 to DAT7, the write sequence indexes #1 to #2 and #4 to #7, and the barrier information (0, 0, 0, 1, 2, 2) in the read buffer 144C.

The memory controller 130 may detect a lost write sequence index WT_ORDER<M> in plural write sequence indexes WT_ORDER that have been temporarily stored in the read buffer 144C and that have consecutive and sequential values. For example, the memory controller 130 may detect that a lost write sequence index is WT_ORDER<#3> by sequentially aligning the write sequence indexes #1 to #2 and #4 to #7.

The memory controller 130 may determine, as target data T_DAT, one or more pieces of data DAT corresponding to write sequence indexes WT_ORDER each having a greater value than the detected write sequence index WT_ORDER<M>, For example, the memory controller 130 may determine, as the target data T_DAT, the data DAT4 to DAT7 corresponding to the write sequence indexes #4, #5, #6, and #7 each having a greater value than the lost write sequence index WT_ORDER<#3>.

The memory controller 130 may detect first data DAT<M−1> having a write sequence index "M−1" and second data DAT<M+1> having a write sequence index "M+1." The first data DAT<M−1> may be data for which a write request has been requested right before the lost write sequence index WT_ORDER<M>. The second data DAT<M+1> may be data for which a write request has been requested right after the lost write sequence index WT_ORDER<M>.

The memory controller 130 may detect first barrier information B_INF1 of the first data DAT<M−1> and second barrier information B_INF2 of the second data DAT<M+1> by using plural pieces of barrier information BR_INF.

The first barrier information BR_INF1 may be barrier information BR_INF corresponding to a first write sequence index WT_ORDER<M−1> having a value that is "1" smaller than a value of the lost write sequence index WT_ORDER<M>. The second barrier information BR_INF2 may be barrier information BR_INF corresponding to a second write sequence index WT_ORDER<M+1> having a value that is '1' greater than a value of the lost write sequence index WT_ORDER<M>.

For example, as illustrated in FIG. 9A, the memory controller 130 may determine, as the first barrier information BR_INF1, "0" that is barrier information BR_INF corresponding to "#2", that is, the first write sequence index WT_ORDER<M−1> having a value that is "1" smaller than a value of the lost write sequence index WT_ORDER<#3>, Furthermore, the memory controller 130 may determine, as the second barrier information BR_INF2, "0" that is barrier information BR_INF corresponding to "#4", that is, the second write sequence index WT_ORDER<M+1> having a value that is "1" greater than a value of the lost write sequence index WT_ORDER<#3>.

The memory controller 130 may determine, based on the first barrier information BR_INF1 and the second barrier information BR_INF2, whether a barrier request BR_REQ for the first data DAT<M−1> has been received from the external device 102.

First, the memory controller 130 may determine whether the first barrier information BR_INF1 and the second barrier information BR_INF2 are the same. When the first barrier information BR_INF1 and the second barrier information BR_INF2 are the same, the memory controller 130 may determine that the barrier request BR_REQ for the first data DAT<M−1> has not been received between first timing at which a write request for the first data DAT<M−1> has been requested and second timing at which a write request for the second data DAT<M+1> has been requested.

For example, as illustrated in FIG. 9A, first, the memory controller 130 may determine whether "0", that is, the first barrier information BR_INF1 corresponding to the first write sequence index WT_ORDER<#2>, and "0", that is, the second barrier information BR_INF2 corresponding to the second write sequence index #4, are the same. The first barrier information BR_INF1 and the second barrier information BR_INF2 are the same as a result of the determination. Accordingly, the memory controller 130 may determine that the barrier request BR_REQ for the first data DAT<M−1> has not been received. Accordingly, the memory controller 130 may perform a recovery operation on target data T_DAT by determining that the barrier request BR_REQ for the first data DAT<M−1> has not been received.

That is, the memory controller 130 may recognize that lost data corresponding to the lost write sequence index WT_ORDER<#3> is not data that needs to be written in the last order of a specific data group GROUP. Furthermore, the memory controller 130 may know that the lost data is data that belongs to the same data group GROUP as a group of the first data DAT<M−1> and the second data DAT<M+1> that are stored in the memory device 150.

Accordingly, the memory controller 130 may process that the recovery of the lost data corresponding to the lost write sequence index WT_ORDER<#3> is impossible, and may determine to perform a data recovery operation SPOR on the target data DAT4 to DAT7.

Hereinafter, a detailed example of a method of determining not to perform a data recovery operation (SPOR) on target data is described with reference to FIG. 9B.

The memory controller 130 may read, from the memory device 150, the plural pieces of data DAT1 to DAT3 and DAT5 to DAT7 that have been stored in the memory device 150 and the write sequence indexes #1 to #3 and #5 to #7 and the barrier information (0, 0, 0, 1, 2, 2) corresponding to the plural pieces of data DAT1 to DAT3 and DAT5 to DAT7, respectively, and may temporarily store the plural pieces of data DAT1 to DAT3 and DAT5 to DAT7, the write sequence indexes #1 to #3, and #5 to #7, and the barrier information (0, 0, 0, 1, 2, 2) in the read buffer 144C.

The memory controller 130 may detect the lost write sequence index WT_ORDER<M> in the plural write sequence indexes WT_ORDER that have been temporarily stored in the read buffer 144C and that have consecutive and sequential values. For example, the memory controller 130 may detect that a lost write sequence index is WT_ORDER<#4> by sequentially aligning the write sequence indexes #1 to #2 and #4 to #7.

The memory controller 130 may determine, as target data T_DAT, at least one data DAT corresponding to a write sequence index WT_ORDER having a greater value than the detected write sequence index WT_ORDER<M>. For example, the memory controller 130 may determine, as the target data T_DAT, the data DAT5 to DAT7 corresponding to the write sequence indexes #5, #6, and #7 each having a greater value than the lost write sequence index WT_ORDER<#4>.

The memory controller 130 may detect first data DAT<M−1> having a write sequence index "M−1" and second data DAT<M+1> having a write sequence index "M+1." The first data DAT<M−1> may be data for which a write request has been requested right before the lost write sequence index WT_ORDER<M>. The second data DAT<M+1> may be data for which a write request has been requested right after the lost write sequence index WT_ORDER<M>.

The memory controller 130 may detect first barrier information B_INF1 of the first data DAT<M−1> and second barrier information B_INF2 of the second data DAT<M+1> by using plural pieces of barrier information BR_INF.

The first barrier information BR_INF1 may be barrier information BR_INF corresponding to a first write sequence index WT_ORDER<M−1> having a value that is "1" smaller than a value of the lost write sequence index WT_ORDER<M The second barrier information BR_INF2 may be barrier information BR_INF corresponding to a second write sequence index WT_ORDER<M+1> having a value that is "1" greater than a value of the lost write sequence index WT_ORDER<M>.

For example, as illustrated in FIG. 9B, the memory controller 130 may determine, as the first barrier information BR_INF1, "0" that is barrier information BR_INF corresponding to "#3", that is, the first write sequence index WT_ORDER<M−1> having a value that is "1" smaller than a value of the lost write sequence index WT_ORDER<#4>. Furthermore, the memory controller 130 may determine, as the second barrier information BR_INF2, "1" that is barrier information BR_INF corresponding to "#5", that is, the second write sequence index WT_ORDER<M+1> having a value that is "1" greater than a value of the lost write sequence index WT_ORDER<#4>.

Based on the first barrier information BR_INF1 and the second barrier information BR_INF2, the memory controller 130 may determine whether a barrier request BR_REQ for the first data DAT<M−1> has been received from the external device 102.

First, the memory controller 130 may determine whether the first barrier information BR_INF1 and the second barrier information BR_INF2 are the same. When the first barrier information BR_INF1 and the second barrier information BR_INF2 are not the same, the memory controller 130 may determine that the barrier request BR_REQ for the first data DAT<M−1> has been received between first timing at which a write request for the first data DAT<M−1> has been requested and second timing at which a write request for the second data DAT<M+1> has been requested.

For example, as illustrated in FIG. 9B, first, the memory controller 130 may determine whether "0", that is, the first barrier information BR_INF1 corresponding to the first write sequence index WT_ORDER<#3>, and "1", that is, the second barrier information BR_INF2 corresponding to the second write sequence index #5, are the same. The first barrier information BR_INF1 and the second barrier information BR_INF2 are not the same as a result of the determination. Accordingly, the memory controller 130 may determine that the barrier request BR_REQ for the first data DAT<M−1> has been received.

Accordingly, the memory controller 130 may perform a recovery operation on the target data T_DAT by determining that the barrier request BR_REQ for the first data DAT<M−1> has been received.

That is, the memory controller 130 may recognize that lost data corresponding to the lost write sequence index WT_ORDER<#4> is data that needs to be written in the last order of a specific data group GROUP. Furthermore, the memory controller 130 may know that the lost data is data that does not belong to the same data group GROUP as that of the first data DAT<M−1> and the second data DAT<M+1> that have been stored in the memory device 150.

Accordingly, the memory controller 130 may process that the recovery of the lost data corresponding to the lost write sequence index WT_ORDER<#4> is impossible, and may determine to perform invalidation processing on the target data DAT4 to DAT7 without performing a data recovery operation (SPOR) on the target data DAT4 to DAT7, As described above, an embodiment of the present disclosure can provide an effect in that it can reduce overhead which may occur during an operation of a memory system because an unnecessary data recovery operation can be reduced based on a progress state of a write operation and barrier request reception information.

Hereinafter, a method of a write operation and a data recovery operation (SPOR) attributable to SPO, which are performed by the memory controller 130 according to an embodiment of the present disclosure, are described with reference to FIGS. 10A to 10C.

Figure 10A:
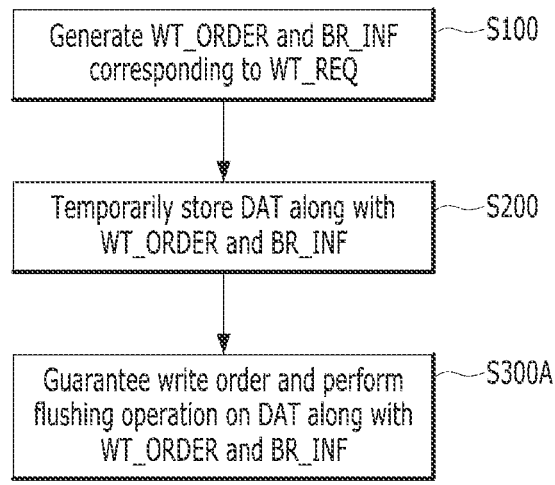
FIGS. 10A to 10C are flowcharts for describing examples of an operation of determining, by the memory controller, whether to perform a data recovery operation according to an embodiment of the present disclosure.

Specifically, FIG. 10A illustrates a method of performing, by the memory controller 130, a write operation on the memory device 150 including a plurality of pages in which data DAT has been stored, in response to a plurality of write requests WT_REQ and a plurality of barrier requests BR_REQ that are received from the external device 102.

A barrier request BR_REQ may be a request for guaranteeing a write order in which that data corresponding to the plurality of write requests WT_REQ is stored in the memory device 150. That is, the write order may include that a write operation for the plurality of write requests WT_REQ received before the barrier request BR_REQ is performed earlier than a write operation for the write request WT_REQ #5 received after the barrier request BR_REQ.

When performing a write operation, the memory controller 130 may generate a write sequence index WT_ORDER and barrier information BR_INF corresponding to a write request WT_REQ that is received from the external device 102 (S100). The generated write sequence index WT_ORDER and barrier information BR_INF may be stored in the temporary buffer 144A.

The write sequence index WT_ORDER may indicate the order in which the write request WT_REQ has been received from the external device 102. The barrier information BR_INF may indicate whether a received barrier request BR_REQ is present before a write request WT_REQ corresponding to the barrier information BR_INF is received. The barrier information BR_INF may include the accumulated number of barrier requests BR_REQ that have been received earlier than the write request WT_REQ corresponding to the barrier information BR_INF. Furthermore, the barrier information BR_INF may include timing at which a barrier request that has been most recently received, among barrier requests BR_REQ received before the write request WT_REQ corresponding to the barrier information BR_INF is received, is received.

The memory controller 130 may temporarily store data DAT in a plurality of write buffers that are included in the memory controller 130, along with the write sequence index WT_ORDER and the barrier information BR_INF (S200).

Figure 10B:
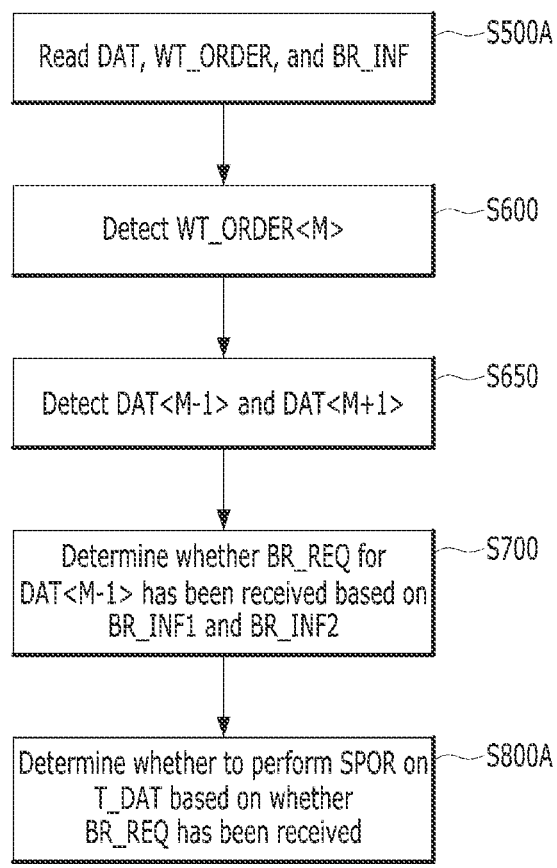
Figure 10C:
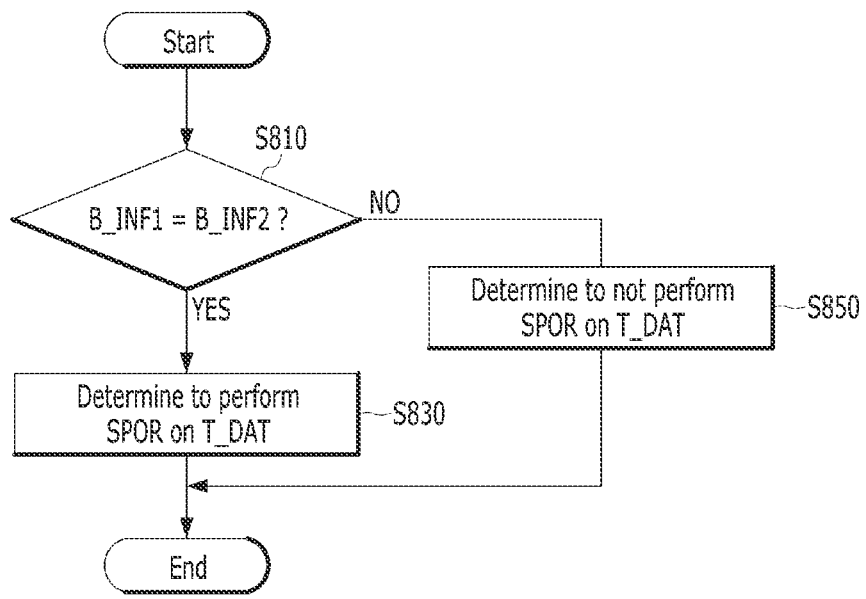

The memory controller 130 may flush, into the memory device 150, the data DAT, the write sequence index WT_ORDER, and the barrier information BR_INF that have been temporarily stored in the plurality of write buffers (S300A), Upon flushing operation, the write sequence index WT_ORDER and the barrier information BR_INF may be stored in a spare region of a page in which the data DAT has been stored, FIGS. 10B and 10C illustrate methods of determining, by the memory controller 130 according to an embodiment of the present disclosure, whether to perform a data recovery operation (SPOR) attributable to SPO.

When power is supplied again after SPO, the memory controller 130 may read, from the memory device 150, data DAT that has been stored in the memory device 150 and a write sequence index WT_ORDER and barrier information BR_INF corresponding to the data DAT (5500A), The write sequence index WT_ORDER and the barrier information BR_INF may be read from a spare region of the same page in which the data DAT has been stored.

The memory controller 130 may detect a lost write sequence index WT_ORDER<M> in the write sequence index WT_ORDER (S600), Furthermore, the memory controller 130 may determine that the recovery of lost data corresponding to the lost write sequence index WT_ORDER<M> is impossible. The memory controller 130 may determine target data T_DAT by using the lost write sequence index WT_ORDER<M>. The target data T_DAT may include one or more pieces of data corresponding to write sequence indexes WT_ORDER each having a greater value than the lost write sequence index WT_ORDER<M>.

The memory controller 130 may detect first data DAT<M−1> having a write sequence index "M−1" and second data DAT<M+1> having a write sequence index "M+1" (S650).

The memory controller 130 may detect first barrier information B_INF1 of the first data DAT<M−1> and second barrier information B_INF2 of the second data DAT<M+1> by using plural pieces of barrier information BR_INF.

Based on whether the first barrier information B_INF1 and the second barrier information B_INF2 are the same, the memory controller 130 may determine whether a barrier request BR_REQ for the first data DAT<M−1> has been received from the external device 102 (S700).

The memory controller 130 may determine whether to perform a data recovery operation (SPOR) on the target data T_DAT based on whether the barrier request BR_REQ for the first data DAT M−1> has been received (S800A).

The first barrier information BR_INF1 may be barrier information BR_INF corresponding to the first write sequence index WT_ORDER<M−1> having a value that is "1" smaller than a value of the lost write sequence index WT_ORDER<M>. The second barrier information BR_INF2 may be barrier information BR_INF corresponding to the second write sequence index WT_ORDER<M+1> having a value that is "1" greater than a value of the lost write sequence index WT_ORDER<M>.

FIG. 10C illustrates a detailed example of a method of determining whether to perform the data recovery operation (SPOR) in S800A.

Referring to FIG. 10C, the memory controller 130 may determine whether the first barrier information BR_INF1 and the second barrier information BR_INF2 are the same (S810).

When the first barrier information BR_INF1 and the second barrier information BR_INF2 are the same (YES in S810), the memory controller 130 may determine to perform the data recovery operation (SPOR) on the target data T_DAT (S830).

When the first barrier information BR_INF1 and the second barrier information BR_INF2 are not the same (NO in S810), the memory controller 130 may determine not to perform the data recovery operation (SPOR) on the target data T_DAT, and may perform invalidation processing on the target data T_DAT (S850).

Hereinafter, a write operation and a data recovery operation (SPOR) attributable to SPO, which are performed by the memory controller 130 according to another embodiment of the present disclosure, are described with reference to FIGS. 11A to 11C.

Figure 11A:
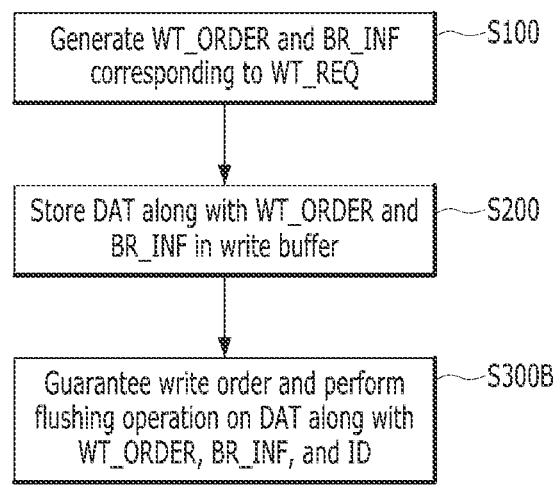
FIGS. 11A to 11C are flowcharts for describing examples of an operation of determining, by the memory controller, whether to perform a data recovery operation according to another embodiment of the present disclosure.

S100 and S200 in FIG. 11A are the same as S100 and S200 in FIG. 10A, and a description thereof is omitted.

After S200, the memory controller 130 may flush, into the memory device 150, identification information ID indicative of a logical location of the memory device 150 at which data DAT has been stored, in addition to the data DAT, a write sequence index WT_ORDER, and barrier information BR_INF that have been temporarily stored in the memory device 150 (S300B). The identification information ID may include logical unit (LU) or device partitioning information, but the present disclosure is not limited thereto. The write sequence index WT_ORDER, the barrier information BR_INF, and the identification information ID may be stored in a spare region of a page in which the data DAT has been stored, FIGS. 11B and 11C illustrate methods of determining, by the memory controller 130 according to another embodiment of the present disclosure, whether to perform a data recovery operation (SPOR) attributable to SPO.

Figure 11B:
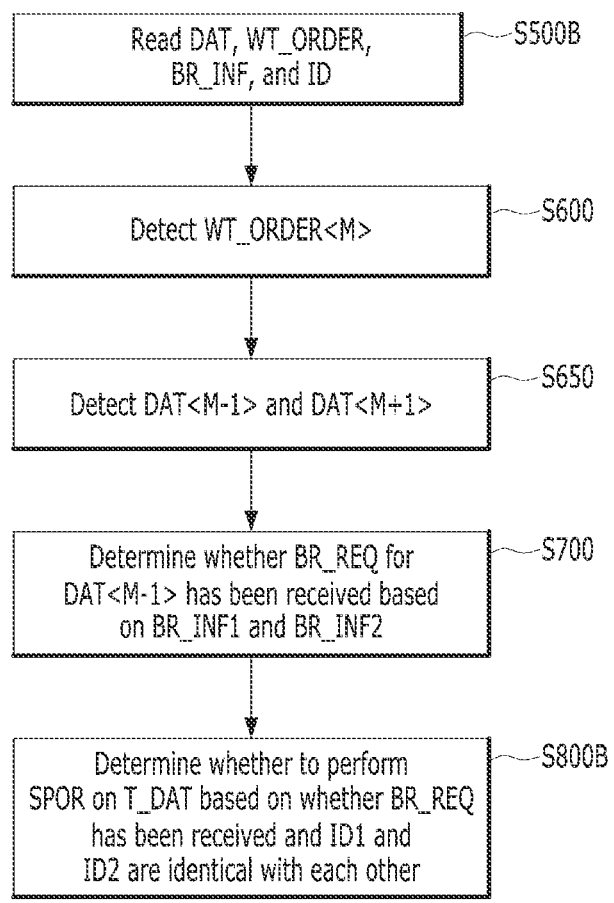

Referring to FIG. 11B, the memory controller 130 may read, from the memory device 150, identification information ID along with data DAT, a write sequence index WT_ORDER, and barrier information BR_INF (S500B).

S600, S650, and S700 in FIG. 11B are the same as S600, S650, and S700 in FIG. 10B, respectively, and a description thereof is omitted.

After S700, the memory controller 130 may determine whether to perform a data recovery operation (SPOR) on target data T_DAT corresponding to a write sequence index having a greater value than the lost write sequence index WT_ORDER<M>, based on the first and second barrier information BR_INF1 and BR_INF2 and first and second identification information ID1 and ID2 (S800B).

Figure 11C:
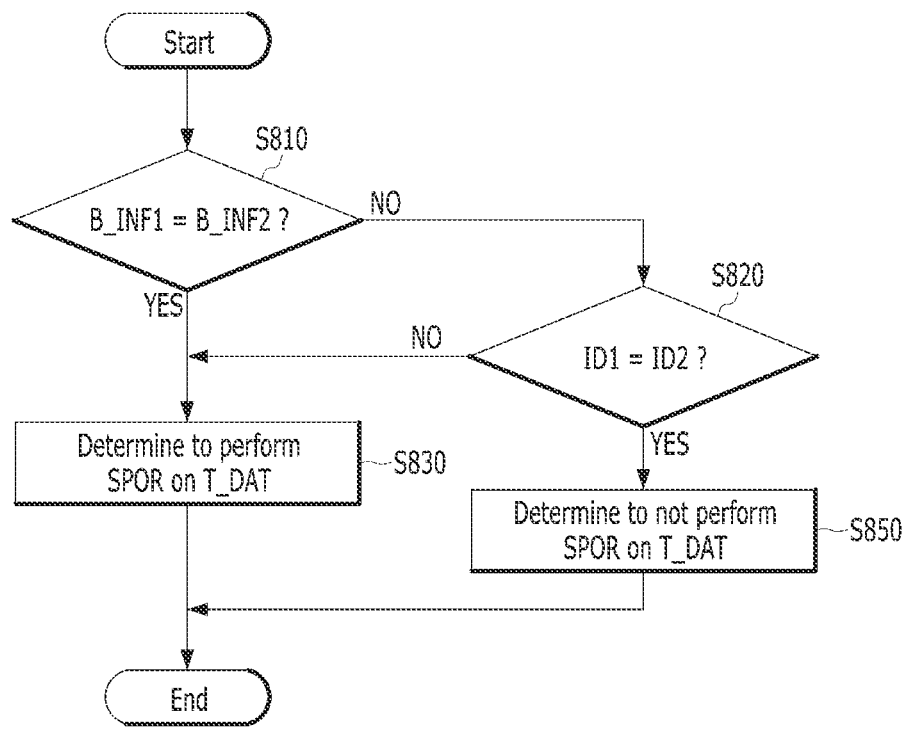

FIG. 11C illustrates a detailed example of a method of determining whether to perform the data recovery operation (SPOR) in S800B, Referring to FIG. 11C, the memory controller 130 may determine whether the first barrier information BR_INF1 and the second barrier information BR_INF2 are the same (S810).

When the first barrier information BR_INF1 and the second barrier information BR_INF2 are the same (YES in S810), the memory controller 130 may determine to perform a data recovery operation (SPOR) on the target data T_DAT (S830).

When the first barrier information BR_INF1 and the second barrier information BR_INF2 are not the same (NO in S810), the memory controller 130 may determine whether the first identification information ID1 and the second identification information ID1 are the same (S820). The first identification information ID1 may include identification information ID corresponding to the lost write sequence index WT_ORDER<M>. The second identification information ID1 may include identification information ID of the target data T_DAT.

When the first identification information ID1 and the second identification information ID1 are not the same (NO in S820), the memory controller 130 may determine to perform a data recovery operation (SPOR) on the target data T_DAT (S830).

When the first identification information ID1 and the second identification information ID1 are the same (YES in S820), the memory controller 130 may determine not to perform a data recovery operation (SPOR) on the target data T_DAT, and may perform invalidation processing on the target data T_DAT (S850).

While the present invention has been described with respect to the specific embodiments, it will be apparent to those skilled in the art that various changes and modifications may be made without departing from the spirit and scope of the invention as defined in the following claims. Furthermore, the embodiments may be combined to form additional embodiments.

What is claimed is:

1. A memory controller for controlling a memory device storing plural pieces of data and plural write sequence indexes and plural pieces of barrier information corresponding to the plural pieces of data, the memory controller comprising:
   a data detection circuit configured to detect, when power is supplied after a sudden power-off (SPO), a lost write sequence index "M" among the plural write sequence indexes, and detect first data corresponding to a write sequence index "M−1" and second data corresponding to a write sequence index "M+1";
   a barrier decision circuit configured to determine, based on whether first barrier information of the first data and second barrier information of the second data are identical with each other, whether a barrier request for the first data has been received from a host; and
   a data recovery operation determination circuit configured to determine whether to perform a recovery operation on target data corresponding to the write sequence index "M+1" and thereafter based on whether the barrier request for the first data has been received.

2. The memory controller of claim 1, wherein each of the first barrier information and the second barrier information comprises an accumulated number of barrier requests that have been received before a write request for a corresponding one of the first data and the second data from the host is requested.

3. The memory controller of claim 1, wherein each of the first barrier information and the second barrier information comprises a write sequence index of data for which a write request has been requested right before a most recent barrier request among barrier requests received before a write request for a corresponding one of the first data and the second data from the host is requested.

4. The memory controller of claim 1, wherein the barrier decision circuit is configured to determine that the barrier request for the first data has not been received when the first barrier information and the second barrier information are identical with each other.

5. The memory controller of claim 1, wherein the barrier decision circuit is configured to determine that the barrier request for the first data has been received when the first barrier information and the second barrier information are different from each other.

6. The memory controller of claim 1, wherein the data recovery operation determination circuit is configured to determine not to perform the recovery operation on the target data if the barrier request for the first data has been received.

7. The memory controller of claim 1, wherein the data recovery operation determination circuit is configured to determine to perform the recovery operation on the target data if the barrier request for the first data has not been received.

8. The memory controller of claim 1, wherein the plural write sequence indexes and the plural pieces of barrier information are stored in spare regions of pages in which the plural pieces of data are stored, respectively.

9. An operating method of a memory controller, the operating method comprising:
   reading, from a memory device when power is supplied after a sudden power-off (SPO), plural pieces of data and plural write sequence indexes and plural pieces of barrier information corresponding to the plural pieces of data;
   detecting a write sequence index "M" corresponding to lost data among the plural pieces of data;
   detecting first data corresponding to a write sequence index "M−1" and second data corresponding to a write sequence index "M+1";
   determining, based on first barrier information of the first data and second barrier information of the second data, whether a barrier request for the first data has been received from a host; and
   determining whether to perform a recovery operation on target data corresponding to a write sequence index "M+1" and thereafter based on whether the barrier request for the first data has been received.

10. The operating method of claim 9, wherein each of the first barrier information and the second barrier information comprises an accumulated number of barrier requests that have been received before a write request for a corresponding one of the first data and the second data from the host is requested.

11. The operating method of claim 9, wherein each of the first barrier information and the second barrier information comprises a write sequence index of data for which a write request has been requested right before a most recent barrier request among barrier requests received before a write request for a corresponding one of the first data and the second data is requested.

12. The operating method of claim 9, wherein the barrier request for the first data is determined not to have been received when the first barrier information and the second barrier information are identical with each other.

13. The operating method of claim 9, wherein the barrier request for the first data is determined to have been received when the first barrier information and the second barrier information are different from each other.

14. The operating method of claim 9, wherein the recovery operation is determined not to be performed on the target data if the barrier request for the first data has been received.

15. The operating method of claim 9, wherein the recovery operation is determined to be performed on the target data if the barrier request for the first data has not been received.

16. The operating method of claim 9, wherein the plural write sequence indexes and the plural pieces of barrier information are stored in spare regions of pages in which the plural pieces of data are stored, respectively.

17. A memory controller for controlling a memory device storing plural pieces of data and plural write sequence indexes and plural pieces of barrier information corresponding to the plural pieces of data, the memory controller comprising:
- a data detection circuit configured to detect, when power is supplied after a sudden power-off (SPO) a lost write sequence index "M" among the plural write sequence indexes, and detect first data corresponding to a write sequence index "M−1" and second data corresponding to a write sequence index "M+1";
- a barrier decision circuit configured to determine, based on whether first barrier information of the first data and second barrier information of the second data are identical with each other, whether a barrier request for the first data has been received from a host; and
- a data recovery operation determination circuit configured to determine whether to perform a recovery operation on target data corresponding to a write sequence index "M+1" and thereafter based on whether logical device identifiers of the first data and the second data are identical with each other if the barrier request for the first data has been received.

18. The memory controller of claim 17, wherein each of the first barrier information and the second barrier information comprises an accumulated number of barrier requests that have been received before a write request for a corresponding one of the first data and the second data from the host is requested.

19. The memory controller of claim 17, wherein each of the first barrier information and the second barrier information comprises a write sequence index of data for which a write request has been requested right before a most recent barrier request among barrier requests received before a write request for a corresponding one of the first data and the second data from the host is requested.

20. The memory controller of claim 17, wherein the barrier decision circuit is configured to determine that the barrier request for the first data has been received when the first barrier information and the second barrier information are different from each other.

21. The memory controller of claim 17, wherein the data recovery operation determination circuit is configured to determine to perform the recovery operation when the logical device identifiers of the first data and the second data are different from each other.

22. The memory controller of claim 17, wherein the plural write sequence indexes and the plural pieces of barrier information are stored in spare regions of pages in which the plural pieces of data are stored, respectively.

23. The memory controller of claim 17, wherein the data recovery operation determination circuit is configured to determine not to perform the recovery operation when the logical device identifiers of the first data and the second data are identical to each other.

24. An operating method of a memory controller, comprising:
- reading, from a memory device when power is supplied after a sudden power-off (SPO), plural pieces of data and plural write sequence indexes and plural pieces of barrier information corresponding to the plural pieces of data;
- detecting a write sequence index "M" corresponding to lost data among the plural pieces of data;
- detecting first data corresponding to a write sequence index "M−1" and second data corresponding to a write sequence index "M+1";
- determining, based on first barrier information of the first data and second barrier information of the second data, whether a barrier request for the first data has been received from a host; and
- determining whether to perform a recovery operation on target data corresponding to a write sequence index "M+1" and thereafter based on whether logical device identifiers of the first data and the second data are identical with each other if the barrier request for the first data has been received.

25. The operating method of claim 24, wherein each of the first barrier information and the second barrier information comprises an accumulated number of barrier requests that have been received before a write request for a corresponding one of the first data and the second data from the host is requested.

26. The operating method of claim 24, wherein each of the first barrier information and the second barrier information comprises a write sequence index of data for which a write request has been requested right before a most recent barrier request among barrier requests received before a write request for a corresponding one of the first data and the second data is requested.

27. The operating method of claim 24, wherein the barrier request for the first data is determined to have been received when the first barrier information and the second barrier information are different from each other.

28. The operating method of claim 24, wherein the recovery operation is determined to be performed when the logical device identifiers of the first data and the second data are different from each other.

29. The operating method of claim 24, wherein the recovery operation is determined not to be performed when the logical device identifiers of the first data and the second data are identical to each other.

30. The operating method of claim 24, wherein the plural write sequence indexes and the plural pieces of barrier information are stored in spare regions of pages in which the plural pieces of data are stored, respectively.

31. An operating method of a controller, the operating method comprising:
- flushing a sequence of data pieces therefrom into a memory device when a power supply is interrupted; and
- recovering, when the power supply is recovered and an M-th data piece is determined as lost in the sequence during the flushing of the sequence, an (M+1)-th data piece and thereafter in the sequence if a barrier request is provided thereto for an (M−1)-th data piece.

32. The operating method of claim 31, further comprising flushing, therefrom into the memory device, sets each of an index within the sequence and an information piece during the flushing of the sequence, the sets respectively corresponding to the flushed data pieces of the sequence, and
wherein the recovering includes determining the barrier request for the (M−1)-th data piece as provided thereto when the information pieces respectively corresponding to the (M−1)-th and (M+1)-th data pieces have the same value.

33. The operating method of claim 32, wherein the information piece corresponding to the data piece represents at least one of:
- an accumulated number of barrier requests provided thereto before a write request for the data piece, and the index corresponding to a data piece, for which a write request is provided right before a most recent one of the barrier requests.

* * * * *